United States Patent [19]
Gregorek et al.

[11] Patent Number: 5,557,658
[45] Date of Patent: Sep. 17, 1996

[54] COMMUNICATIONS MARKETING SYSTEM

[75] Inventors: Mark R. Gregorek, Mahwah; Jeffrey C. Dillow, Sparta, both of N.J.

[73] Assignee: Quantum Systems, Inc., Ramsey, N.J.

[21] Appl. No.: 289,472

[22] Filed: Aug. 11, 1994

Related U.S. Application Data

[63] Continuation-in-part of Ser. No. 245,723, May 18, 1994, Pat. No. 5,428,670, which is a continuation-in-part of Ser. No. 718,080, Jun. 20, 1991, Pat. No. 5,321,740.

[51] Int. Cl.$^6$ .............................. H04M 3/22; H04M 3/42; H04M 11/08
[52] U.S. Cl. ................ 379/67; 379/88; 379/96; 379/215; 379/257; 379/393
[58] Field of Search .................. 379/67, 87, 215, 379/257, 374, 82, 84, 88, 201, 372, 96, 381, 396, 163, 162, 393

[56] References Cited

U.S. PATENT DOCUMENTS

| | | | |
|---|---|---|---|
| 1,958,896 | 5/1934 | Lesavoy et al. | 379/84 |
| 3,165,590 | 1/1965 | Brooks et al. | 379/252 |
| 3,482,057 | 12/1969 | Abbott et al. | 379/67 |
| 3,700,813 | 10/1972 | Colman | 379/357 |
| 4,255,621 | 3/1981 | Marheine | 379/67 |
| 4,277,649 | 7/1981 | Sheinbein | 379/201 |
| 4,451,704 | 5/1984 | Winkelman | 379/67 |
| 4,510,349 | 4/1985 | Segre-Amar | 379/87 |
| 4,720,848 | 1/1988 | Akiyama | 379/88 |
| 4,809,321 | 2/1989 | Morganstein et al. | 379/211 |
| 4,811,382 | 3/1989 | Sleevi | 379/67 |
| 4,850,007 | 7/1989 | Marino et al. | 379/67 |
| 4,910,762 | 3/1990 | Blom | 379/67 |
| 4,932,042 | 6/1990 | Baral et al. | 379/67 |
| 5,007,076 | 4/1991 | Blakley | 379/67 |
| 5,309,512 | 5/1994 | Blackmon et al. | 379/210 |
| 5,333,186 | 7/1994 | Gupta | 379/201 |

FOREIGN PATENT DOCUMENTS

| | | | |
|---|---|---|---|
| 1198843 | 12/1985 | Canada | 379/88 |
| 3306313 | 8/1984 | Germany | 379/88 |
| 57-87661 | 6/1982 | Japan | 379/257 |
| 58-108855 | 6/1983 | Japan | 379/88 |
| 2170377 | 7/1986 | United Kingdom | 379/88 |

OTHER PUBLICATIONS

"Scanning Schemes in Electronic Telephone Systems", *Telephony*, Y. Jayachandra, Nov. 20, 1978, pp. 40, 41, 44.

*Primary Examiner*—Thomas W. Brown
*Attorney, Agent, or Firm*—Panitch Schwarze Jacobs & Nadel, P.C.

[57] ABSTRACT

A communications marketing system for selectively modifying an existing communications network by modifying a portion of the processing software permits transmitting a generally continuous pre-recorded announcement to a network station which has been temporarily disconnected from a called network station and placed on hold within the network. The network is adapted for allowing an identified called station connected to a first call from a first party at a first network address to receive a second call from a second party at a second network address. The network interrupts the called station and signals the called station of the second call. The called station can then choose to connect to the second call and temporarily disconnect the first party, placing the first party on hold within the network, and thereafter, the called station may switch between the first and second calls. The system plays at least one generally continuous announcement to the party placed on hold by the called station until the called station signals the network to reconnect the called station to the party on hold, at which time the playing of the announcement is terminated. The system further provides a custom audio and/or visual message and/or menu in lieu of a dial tone signal to a party initiating a connection with the communications network.

43 Claims, 14 Drawing Sheets

COMMUNICATIONS MARKETING SYSTEM

CROSS REFERENCE TO RELATED APPLICATION

This is a continuation-in-part of U.S. patent application Ser. No. 08/245,723, filed May 18, 1994 now U.S. Pat. No. 5,428,670, which is a continuation-in-part of U.S. patent application Ser. No. 07/718,080, filed Jun. 20, 1991, and entitled "Telephone Marketing System", now U.S. Pat. No. 5,321,740.

FIELD OF THE INVENTION

The present invention relates to a communications system and, more particularly, to a communications system for selectively modifying a communications network by replacing at least a portion of an audible or visual call progress signal generated by the communications network by a message or announcement.

BACKGROUND OF THE INVENTION

Most conventional communications networks today, particularly existing telephone networks, provide a calling party with an audible ringback signal when an intended called network address or station line is idle and a busy signal when the intended called network address or station line is already in use, i.e., the telephone or other device at the called network address is being used. Conventional networks also provide a calling party with an audible dial tone signal when the telephone or other device at the calling station signals the network that they wish to initiate a call or network communication and a line is available. Most conventional communications networks today, particularly existing telephone networks, also provide advanced features, such as call waiting. The call waiting feature allows a station or device already connected to another station or device to temporarily disconnect from a first call and receive a second incoming call, and then switch back and forth between the other parties.

During many network communications today between network devices, such as a connection between a network terminating station device and a video server, there are often periods during the communication when one party or device needs to process information or process a request, creating idle line time. It is also often necessary for one party or device to place the other party or device on hold within the network, again creating idle line time.

Many calling parties become frustrated when encountering a busy signal especially since the standard or usual tones used to signify a busy condition are annoying. The time that a calling party and/or the calling station equipment remains on the line and attempts to redial the called network address or station line normally represents wasted time and unnecessarily occupies network equipment without generating network income. The time spent while waiting for the call to be completed, i.e., during the audible ringback period or other call set-up periods, waiting while a called party or station device answers another incoming call, or time spent on hold within the network while a called party or station device temporarily desires to uninterruptibly process information is also wasted time and money.

It would be beneficial to be able to productively occupy the time that the calling party and/or the calling station equipment is on the line or occupying a portion of the network without annoying the calling party by requiring the calling party to listen to or view a meaningless or annoying busy signal, a ringback signal, or wait idly while the called station receives another incoming call or processes information. The foregoing scenario holds true whether the calling party is attempting to complete a call to another telephone or to any other location within a communications network which has a network address assigned to it, regardless of the station equipment which may be connected at either end of the network connection or within the network itself.

It would be advantageous to have a communications system which would replace the audible or visual ringback and/or busy signals initiated by the communications network with a series of pre-recorded audio and/or video announcements which would provide the calling party with useful information. When the telephone or other device at the called network address or station line is answered, the announcements would discontinue and the connection would be completed in the usual manner. In addition, the announcements would be discontinued if the calling party abandons the communication or attempted communication.

It would also be advantageous to have a communications system which would replace the audible dial tone signal initiated by the communications network with a custom audio/video message and menuing system which would allow a calling station to receive audio and/or visual announcements and interact with the network or make menu choices providing the party wishing to initiate a call with useful information. When the telephone or other device signals to the network to initiate a connection or makes a menu selection, the announcements would discontinue and the connection would be completed in the usual manner. In addition, the announcements would be discontinued if the calling party abandons the communication.

It would also be advantageous to have a communications system which would provide a device which has been temporarily disconnected from a station and placed on hold within the network while the other station answers or returns to another call with a series of pre-recorded announcements which would provide the waiting party with useful information. When the telephone or other device at the other network address or station line signals to reconnect to the waiting party, the announcements would discontinue and the connection would be completed in the usual manner. In addition, the announcements would be discontinued if the waiting party abandons the communication or attempted communication.

It would further be advantageous to have a communications system which would provide a device which has been temporarily disconnected from a station and placed on hold within the network, while the other station processes information, with a series of pre-recorded announcements which would provide the party or device on hold within the network with useful information. When the other telephone or device at the other network address or station line signals to reconnect to the party or device on hold within the network, the announcements would discontinue and again the connection would be completed in the usual manner. In addition, the announcements would be discontinued if the party on hold within the network abandons the communication.

The present invention is directed to a communications marketing system which is capable of replacing a busy signal or ringback signal by one or more pre-recorded announcements. The present communications marketing system notifies the calling party or caller that the line of the called network address or station is either busy or idle and, if busy, that the line will be automatically retried for completion of the call after expiration of a predetermined time period. If the line is idle, one or more pre-recorded announcements are played for the caller, the announcements continuing until a party or device at the called network address or station responds by answering the telephone or otherwise. At that time, the announcements are discontinued and the call is completed. If the called network address or station line is busy, a number of pre-recorded announcements are played for the predetermined time period. The announcements can vary in subject matter. Once the called network address or station line is determined to be idle, i.e., no longer in use, the calling party is automatically connected to the called network address or station line and the announcements are terminated.

The present invention is also directed to a communications marketing system which is capable of replacing idle time spent by a party or device temporarily disconnected from another station and placed on hold within the network while the other station answers or returns to another call with one or more pre-recorded announcements. One or more pre-recorded announcements are played for the waiting caller, the announcements continuing until the other party or device at the other network address or station signals to reconnect the call. At that time, the announcements are discontinued and the call is reconnected.

The present invention is also directed to a communications marketing system which is capable of replacing idle time spent temporarily on hold from another station, while the other station processes information or a request, by one or more pre-recorded announcements. For instance, a party or device connected to a server or other device at another network address can be placed on hold within the network by the server while waiting for a network based movie or video game. Additionally, the server or other network device could be placed on hold within the network by the calling party when, for example, a network based movie being viewed or a video game being played is temporarily paused by the calling party. One or more pre-recorded announcements are played for the party on hold within the network, or the party which has paused a network based movie, video game or other video applications, the announcements continuing until either party or device signals to reconnect the call. At that time, the announcements are discontinued and the call is reconnected.

The present invention is further directed to a communications marketing system which is capable of replacing a standard dial tone with a custom audio/video menuing and advertising system when a network station device signals the communications network that it wishes to use the communications line, i.e. by going off-hook or otherwise. A custom menu and/or custom pre-recorded announcements are transmitted to the party or station. The announcements continue until the party or device signals to connect to another network address or station or abandons the call.

SUMMARY OF THE INVENTION

Briefly stated, the present invention comprises a marketing system for selectively modifying an existing communications network by modifying a portion of the processing software of the existing communications network to permit transmitting a generally continuous pre-recorded announcement to a network station which is waiting to reconnect to a call with an identified called station. The system allows an identified called station connected to a first call with a first party at a first station at a first network address to receive another call from another party at another station at a separate network address. The identified called station signals the network to temporarily disconnect the first station or device and place the station or device on hold within the network and connect the identified called station to the other party at the other station. Thereafter, the identified called station can reconnect to the first party at the first station. Means are provided for placing a first call by a first party at a first station having a first network address to a second party at a second station having a second network address. Means are provided for connecting the first call to the second station. Means are provided for placing a second call by a third party at a third station having a third network address to a selected one of the first and second stations. Means are provided for notifying the one selected station of the second call and transmitting a call progress signal to the third station. Means are provided for the one selected station to temporarily disconnect from the nonselected station and place the nonselected station on hold within the network and for connecting the one selected station to the third station. Means are provided for playing at least one generally continuous announcement to the nonselected station while the nonselected station is on hold within the network, and means are provided for the one selected station to disconnect from the third station and reconnect to the nonselected station, thereby terminating the playing of the announcement to the nonselected station.

The present invention further comprises a marketing system for selectively modifying an existing communications network by modifying a portion of the processing software of the existing communications network to permit transmitting a generally continuous pre-recorded announcement to a network station which is waiting to reconnect to a call with another network station. The system allows a selected one station of a first station at a first network address connected to a call with a second station at a second network address to signal the network to temporarily disconnect the other station and place the other station on hold within the network. Thereafter, the selected station is able to reconnect to the other station. Means are provided for placing a call by a first party at a first station having a first network address to a second party at a second station having a second network address. Means are provided for connecting the call to the second station. Means are provided for a selected one of the first and second stations to notify the network to temporarily disconnect from the other station and place the other station on hold within the network. Means are provided for playing at least one generally continuous announcement to the other station while the other station is on hold within the network, and means are provided for the one selected station to reconnect to the other station, thereby terminating the playing of the announcement to the other station.

The present invention further provides a method for use with an existing communications network for playing one or more generally continuous announcements to a network station which is waiting to reconnect to a call with another network station. The communications network allows a first party at a first station at a first network address on a first call with a second party at a second station at a second network address to receive a second call from a third party at a third station at a third network address, the first station signalling the network to temporarily disconnect the second station and place the second station on hold within the network and to connect the first station to the third station. Thereafter, the first station is able to reconnect to the second station. The method includes the steps of connecting a first party at a first station having a first network address to a second party at a second station having a second network address to complete a first call, a third party at a third station having a third network address placing a second call to a selected one of the first and second stations, notifying the one selected station of the second call and transmitting a call progress signal to the third station, the one selected station signalling the network to temporarily disconnect from the nonselected station and place the nonselected station on hold within the network, connecting the one selected station to the third station, playing at least one generally continuous announcement to the nonselected station while the nonselected station is on hold within the network, the one selected station signalling the network to temporarily disconnect from the third station and reconnect to the nonselected station, disconnecting the third station from the one selected station, and terminating the playing of the announcement to the nonselected station and reconnecting the nonselected station to the one selected station.

A method is also provided for use with an existing communications network for playing one or more generally continuous announcements to a network station waiting to reconnect to a call with another network station. The communications network allows a selected one of a first network station at a first network address connected to a call with a second station at a second network address to temporarily disconnect from other station and place the other station on hold within the network. The one selected station can thereafter reconnect to the other station. The method includes the steps of the first station signalling the network to place the second station on hold within the network, temporarily disconnecting the first station from the second network address and placing the second station on hold within the network, playing at least one generally continuous announcement to the first station and to the second station while the second station is on hold within the network, the first station signalling the network to reconnect to the second station, and terminating the playing of the announcement to the first and second stations and reconnecting the second station to the first station.

In yet another embodiment, a marketing system for selectively modifying an existing communications network by modifying a portion of the processing software of the existing communications network and by replacing at least a portion of a dial tone signal generated by the communications network by a generally continuous pre-recorded announcement is provided. The system includes means for placing a first call by a calling party at a first station at a first network address. Means are provided for connecting the first network address to a switch in the communications network, the switch transmitting a dial tone signal to the first station. Means are provided for signalling the switch to activate the marketing system, and means are provided for playing at least one generally continuous announcement to the party at the first station for a predetermined period of time in lieu of the dial tone signal or until the party at the first station abandons the communication attempt.

BRIEF DESCRIPTION OF THE DRAWINGS

The foregoing summary, as well as the following detailed description of preferred embodiments, will be better understood when read in conjunction with the appended drawings. For the purpose of illustrating the invention, there is shown in the drawings embodiments which are presently preferred, it being understood, however, that the invention is not limited to the specific methods and instrumentalities disclosed. In the drawings.

DETAILED DESCRIPTION OF PREFERRED EMBODIMENTS

Figure 1:
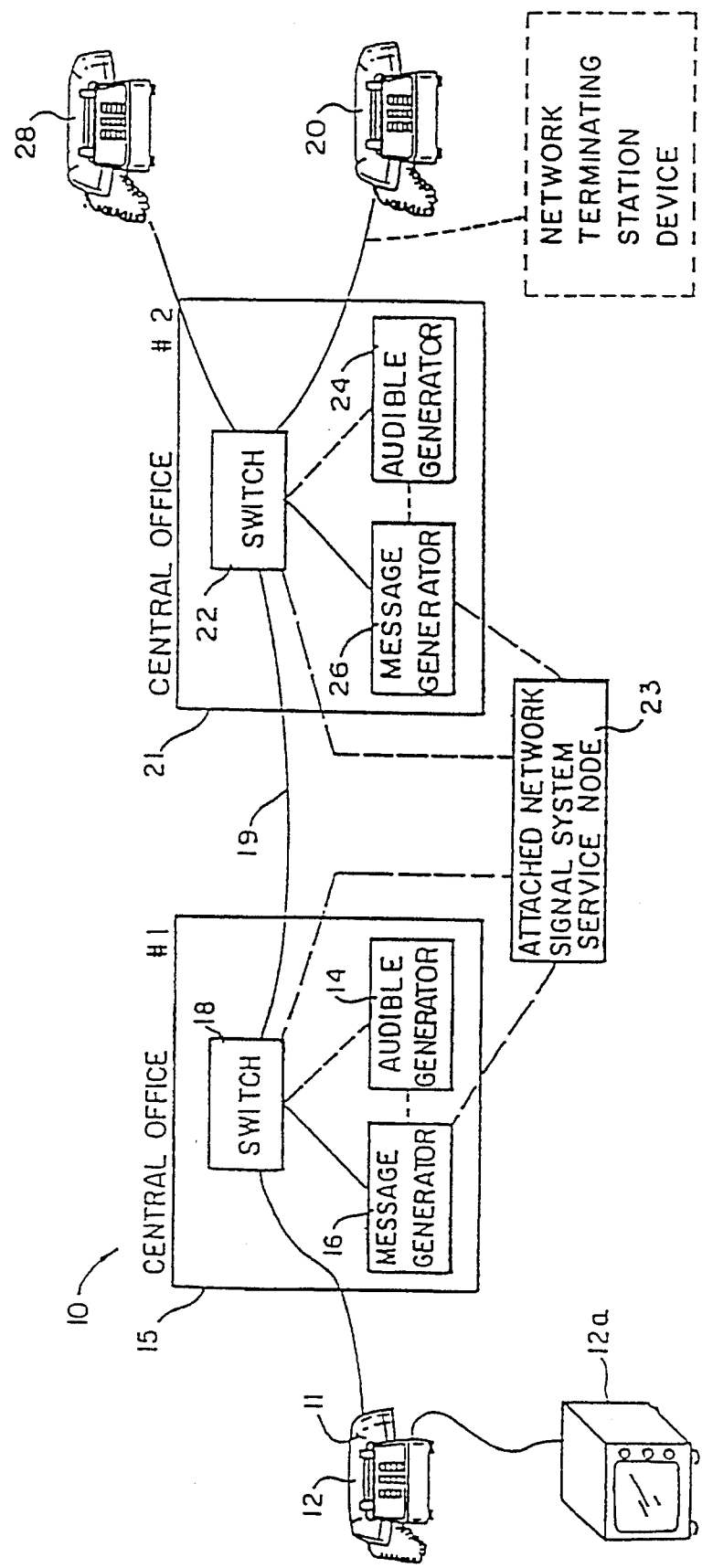
FIG. 1 is a block diagram of a presently preferred embodiment of a communications system in accordance with the present invention.

Referring to the drawings, wherein like numerals indicate like elements throughout, there is shown in FIG. 1 a schematic block diagram of a communications system 10 in accordance with the present invention. The present invention 10 is designed for use with any type of communications network including any network capable of transmitting voice, data, video, multi-media, real time, store and forward, interactive, or hybrid types of information. The communications network may be provided by private or publicly owned local, local exchange, inter-exchange, long distance, international, telecommunications, cable television, broadcast, switched, dedicated or hybrid types of network providers utilizing wireless, facilities-based, satellite-based, or hybrid types of transmission schemes and/or mechanisms. For the sake of brevity and simplicity, the embodiments of the invention illustrated in the figures are specifically directed to a standard or typical telephone system used for providing voice communication between two individual network addresses, in the present embodiment, telephone stations or telephones. However, it should be clearly understood by those skilled in the art from this disclosure that the present invention is not limited to such standard telephone stations or to telephone station communications systems. In addition, while in the described embodiment, one or both of the telephone stations are illustrated as being typical or standard telephone instruments, the term "station" could refer to any device or object which may be connected to or be an integral part of a communication network to allow for the initiation, receipt and interaction of audio and/or visual information, including voice, data, video, multi-media, real-time, store and forward, interactive or hybrid types of information. It should also be clearly understood that the term "station" should be read to include but not be limited to devices such as telephones, televisions, video monitors, video telephones, computers, television set-top converters, modems, video servers, front end processors, other communications networks, and combinations or hybrids thereof.

Referring to FIG. 1, with the communications system 10, a calling party at a first location or station line places a call by means of any type of communication device, in the illustrated embodiment, a first telephone 12, such as but not limited to, a rotary dial or touch tone telephone instrument of a type well known in the art. For purposes of the present description, the term "call" shall not be limited to a voice communication but instead shall mean any communication between two network addresses. The first telephone 12 could also be connected to a video display terminal 12a for transmission of video signals such as a computer terminal, video telephone, television set-top converter, telephone monitor, or the like. It should be understood by those skilled in the art that the communications system 10 is not limited to use with a conventional telephone or with a conventional telephone system but, instead, can be used with any type of communications device or system.

As is well known in the art, when a calling party removes the handset 11 from the base of a telephone 12, a connection is formed with a first switch 18 at a first local central office 15 which is usually associated with a local telephone company. The first switch 18 transmits a dial tone back to the first telephone 12 to indicate the availability of telephone service. The telephone number dialed or otherwise entered by the calling party using the telephone 12 is transmitted to the local central office 15 as a series of signals which are detected by the switch 18. The computerized switch 18 refers to a network control point, network controller, or communications network traffic switching and control mechanism, such as a central office or premises based audio, data, video, or hybrid switch, a packet switch, or Asynchronous Transfer Mode (ATM) switch, or any associated signalling network control point, service control point, or service switching point or system which routes, monitors, and/or handles and controls calls over a communications network. The switch 18 is responsible for determining the destination (network address) of the call based upon the transmitted signal, i.e., the number dialed. The switch 18 transmits the call initiated by the calling party over the communications network 19 toward an identified network address or called station which in the present embodiment comprises a second telephone 20 but could comprise any other type of communication device. The called network address or station is identified by the telephone number entered by the calling party at the first telephone 12. In the present embodiment, the communication network 19 is a local exchange network. However, the communication network 19 could also be an interexchange network, long distance network, international network, telecommunications network, cable television network, broadcast network, switched network, dedicated network, or a hybrid type of the foregoing networks.

The call from the calling party is received by a second computerized switch 22 located at a second local central office 21 which determines the status of the second telephone 20, i.e., whether the second telephone 20 is in a busy state or in an idle state. An attached network signaling system 23 can also determine the busy/idle status of the called network address or station line. The specific procedure by which the switch 22 or an attached network signaling system 23 determines the busy/idle status of the called network address or station line is well known to those skilled in the art and will not be discussed further.

The switch 18, in the present embodiment, is connected to an audible generator or audible signal generator 14 which is capable of generating a ringback signal if the called network address or station line is idle, i.e., the second telephone 20 is not in use, or a busy signal if the called network address or station line is busy, i.e., the second telephone 20 is in use. As will be discussed hereinafter, the switch 22 or an attached network signaling system (ANSS) 23 determines the status of the second telephone line and instructs the audible signal generator 14 or notifies the switch 18 to instruct the audible signal generator 14 to transmit the appropriate call progress signal, i.e., either a ringback or a busy signal. The audible signal generator 14 is of a type well known in the art and, therefore, will not be discussed further. The second switch 22 is connected to a conventional second audible signal generator 24. Depending upon the configuration of the network, either audible signal generator 14 or 24 can transmit the call progress signal to the first telephone 12.

A message generator 16 is also connected to the switch 18 and is capable of supplementing and/or replacing the signals generated by the audible signal generator 14. The switch 18 or an attached network signaling system 23, determines whether the audible signal generator 14 or the message generator 16 is activated as discussed hereinafter. For purposes of discussion, the audible signal generator 14 and the message generator 16 will be assumed to be providing signals and/or announcements to the first telephone 12. As with the first audible signal generator 14, the second audible signal generator 24 is connected to a second switch 22 as is a second message generator 26 which is similar to the first message generator 16. Message generators 16 and 26 can alternatively be located at an attached signaling service node location, if desired.

Announcements are enabled by inserting a software subroutine into the call processing software of the network. It is well known to those in the art the various ways the software can be incorporated into the call processing system of the network and, therefore, such ways will not be discussed further. The software subroutine causes call processing procedures to be modified and allows the message generator 16 to become an integral part of the call completion sequence.

The switch 22 or ANSS 23 first determines the initial busy/idle status of the second telephone 20. If the second telephone 20 is initially busy, the switch 22 or ANSS 23 suspends further call processing for a predetermined period of time. Simultaneously, the switch 22 or ANSS 23 signals the message generator 16 to initiate an announcement sequence which is provided to the first telephone 12. After expiration of the predetermined period of time, the switch 22 or the ANSS 23 rechecks the busy/idle status of the second telephone 20 and again communicates the status to the message generator 16. The software subroutine is designed to allow for regular and periodic checking of the busy/idle status of the second telephone 20 as long as the calling party does not abandon the call and continues to provide the busy/idle status to the message generator 16. Thus, if the second telephone 20 is busy, the second switch 22 or the ANSS 23 can either activate the audible signal generator 14 to generate a busy signal or activate the message generator 16 to play a series of pre-recorded announcements to the calling party for a predetermined period of time while periodically checking to determine if the second telephone 20 is still busy. The message generator 16 is also capable of producing conventional busy signals in place of the audible signal generator 14. The resulting message stream and/or busy signal indicates to the calling party at the first telephone 12 that the second telephone 20 is busy and, if a message is played, indicates that the system will automatically try to make the connection to the second telephone 20 after expiration of a predetermined period of time. A possible time frame for again trying to make the connection to the second telephone is every fifteen seconds. However, it is to be understood by those skilled in the art that any other suitable time frame, including a variable time frame, could be used in the alternative.

If the second telephone 20 is idle, the second switch 22 or the ANSS 23 can either activate the audible signal generator 14 to produce a conventional audible ringback signal or can activate the message generator 16 to play a series of pre-recorded announcements to the calling party for a predetermined period of time. The message generator 16 is also capable of producing a conventional audible ringback signal in place of the audible signal generator 14. In either case, the resulting message or audible ringback signal indicates to the calling party that the second telephone 20 is not currently in use.

In the preferred embodiment, the communications system 10 selects the type of announcements which are to be played to the calling party. The communications system 10 can also determine when a particular announcement is to be played based upon a number of criteria or factors, such as but not limited to, the time of day, the day of the week, the month of the year, the network address of the calling party or the called station line, etc. When a call is initiated to the second telephone 20, the message generator 16 can use an automatic number identification (ANI) system or equivalent to identify the network address of the calling telephone 12. Such systems are well known to those skilled in the art and need not be described in greater detail.

If the message generator 16 is set to determine address of the calling telephone 12, the message generator 16 which announcements are to be played based upon the network can read the network address as provided by the network and can determine the geographical location of the telephone 12 by matching the network address with a location provided by a look-up table located in the memory (not shown) of the message generator 16. The message generator 16 determines which announcements are designated for the particular network address and plays the pre-recorded message in a predetermined segment of time until the telephone 20 is answered or until the call is abandoned.

The message generator 16 can also play certain messages based on the time of day, day of week, month of year or any other time frame reference. A clock (not shown) located within the message generator 16 monitors the time of day, day of week, day of month, month of year and year. When a call is placed to the second telephone 20 from the first telephone 12, and the message generator 16 has been signaled to initiate a message sequence, the information from the clock is read by the message generator 16 and is compared to information located in a look-up table in the memory of the message generator 16 to determine which messages are to be played. The message generator 16 continually retrieves the designated messages in predetermined segments of time until the telephone 20 is answered or the call is abandoned. It should be appreciated that, if desired, live announcements may be provided under control of the message generator 16.

Figure 2:
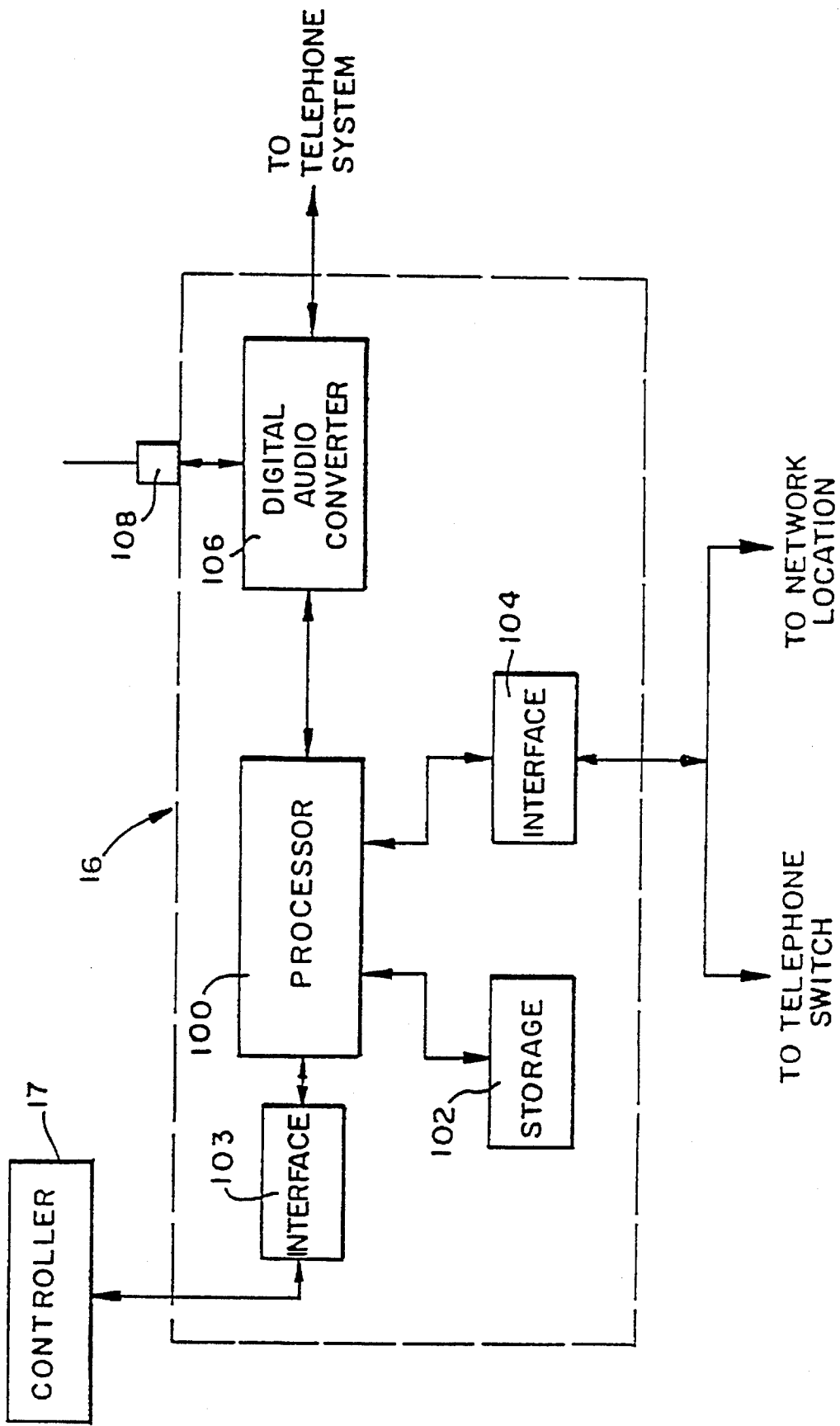
FIG. 2 is a schematic block diagram of a message generator located within the communications system of FIG. 1.

Referring specifically to FIG. 2, there is shown a block diagram depicting the internal components of a preferred embodiment of a message generator 16. Each message generator 16 comprises a processor or microprocessor 100 for processing stored announcements and transmitting the announcements to a telephone 12 of a calling party through the network. It is to be understood by those skilled in the art that any other type of computer, processor or microprocessor can be used in conjunction with the message generator 16. A storage or acts as a mass storage device for storing the pre-recorded memory device 102 is connected to the microprocessor 100 and announcements, associated data, as well as the software necessary for control of the message generator 16 and for associated processing. The storage device 102 is preferably either a magnetic hard disk or an optical storage device, such as, but not limited to, a CD-ROM, CD-I, or optical disk. However, it is understood by those skilled in the art that other means for storing the software and the pre-recorded announcements can also be used, such as a programmable ROM or embedded memory means.

Data relating to a specific pre-recorded announcement is transmitted from the storage device 102 to the memory (not shown) located within or associated with the microprocessor 100 to enable processing of the announcements. The pre-recorded announcements are stored within the storage device 102 until the announcements are retrieved by the microprocessor 100 to be transmitted to the telephone station 12 of the calling party. In the preferred embodiment, the message generator 16 also comprises a digital audio converter or card 106 and/or a video card (not shown) for containing digital pre-recorded advertisements which can be transmitted to the telephone station 12 of the calling party, or if the calling party has a communication system having video capabilities such as a video telephone, video monitor 12a, television, set-top converter or other such device, a video announcement can be transmitted using the video card.

A clock (not shown) is located within or associated with the microprocessor 100 and monitors the period of time necessary for each announcement to be played. The time is recorded and stored within the storage device 102. The clock is also capable of recording the period of time necessary for a sequence of messages to be played to a calling party during a particular call.

When an announcement or a series of announcements are to be played, the telephone switch 18 or the ANSS 23 is connected to the microprocessor 100 via a communication interface device 104, which allows for the transfer of information to and from the message generator 16 through the network. In the preferred embodiment, the communication interface is a digital data communications port (DDCP). Once the microprocessor 100 receives a signal from the switch 18 or the ANSS 23, an announcement is retrieved from the storage device 102. The digitally stored announcement is transmitted to the digital audio converter 106 which converts the digital signals into an audio announcement. The audio announcement, once processed, is transmitted to the first telephone 12. It is understood by those skilled in the art from this disclosure that if the network is a digital network and the receiving device is capable of receiving digital information, the digital announcement can bypass the digital audio converter 106. An interface jack 108 is connected to the digital audio converter 106 to permit audio announcements to be converted to digital format for storage within the storage device 102.

The microprocessor 100 is also connected to a main controller 17 via a communication interface 103, such as a modem, and acts as a main processing system for all message generators located within the communications network or system. The main controller 17 is capable of maintaining data files and of logging into its data files each announcement which is played to a particular first telephone station 12. In the preferred embodiment, the controller 17 records the announcement's file name, play time, geographical area in which the announcement has been played and the billing charge for the played announcement. It is to be understood by those skilled in the art, that the main controller 17 can store any information which is considered to be pertinent to the system's billing and processing requirements. The main controller 17 acts as the central record keeping and billing location. The main controller 17 can also remotely deliver and update all audio and/or video advertising and other announcements contained at each message generator 16. In the preferred embodiment, the message generator 16 is also capable of dialing to or being dialed by remote computing equipment (not shown) in order to transfer audio and video advertisements and/or messages or to delete or modify previously stored announcements.

Figure 3:
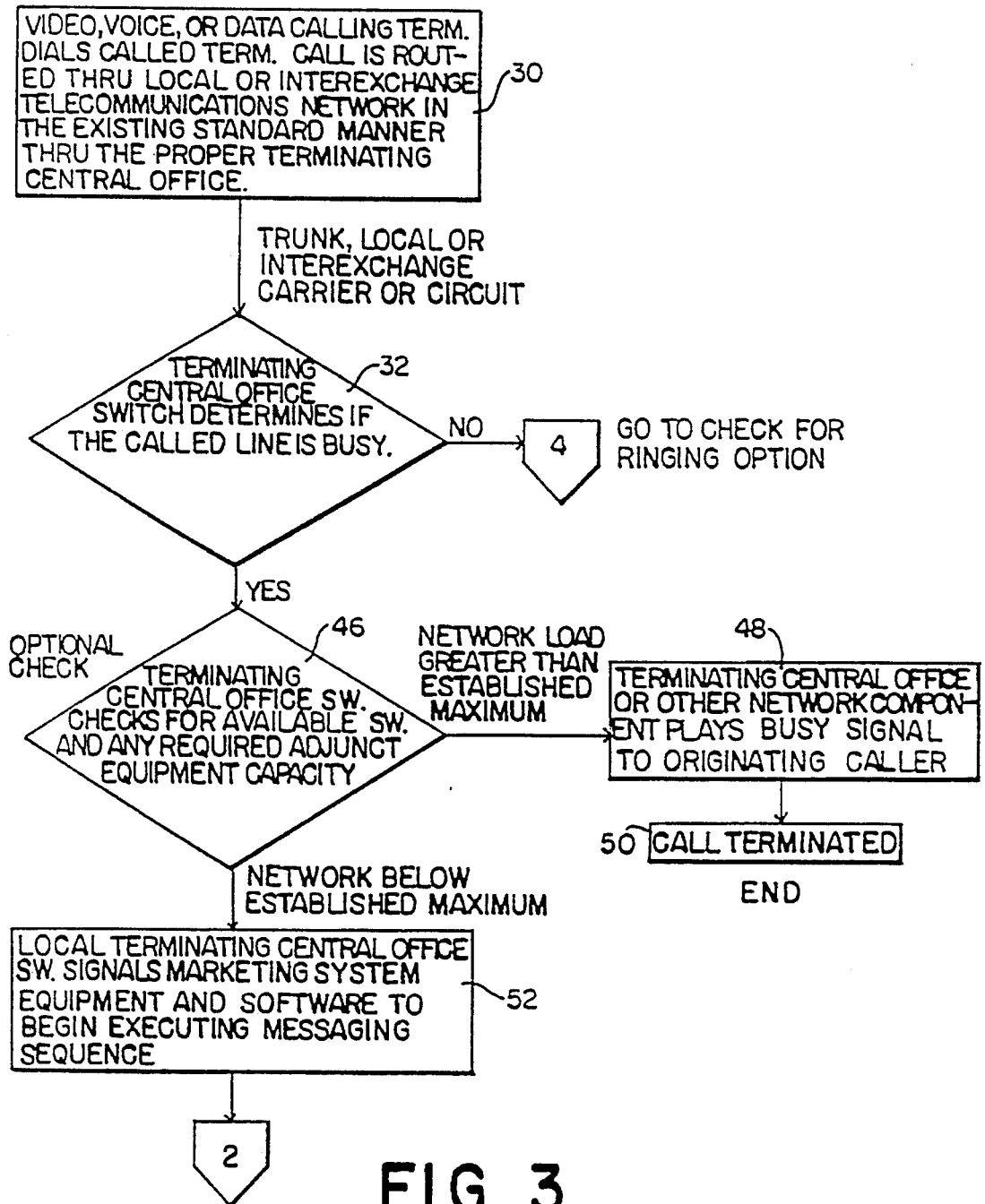
FIGS. 3–11 are flow diagrams of the call handling procedures of the communications system of FIG. 1 and its interaction with the communications network call handling procedures.
Figure 4:
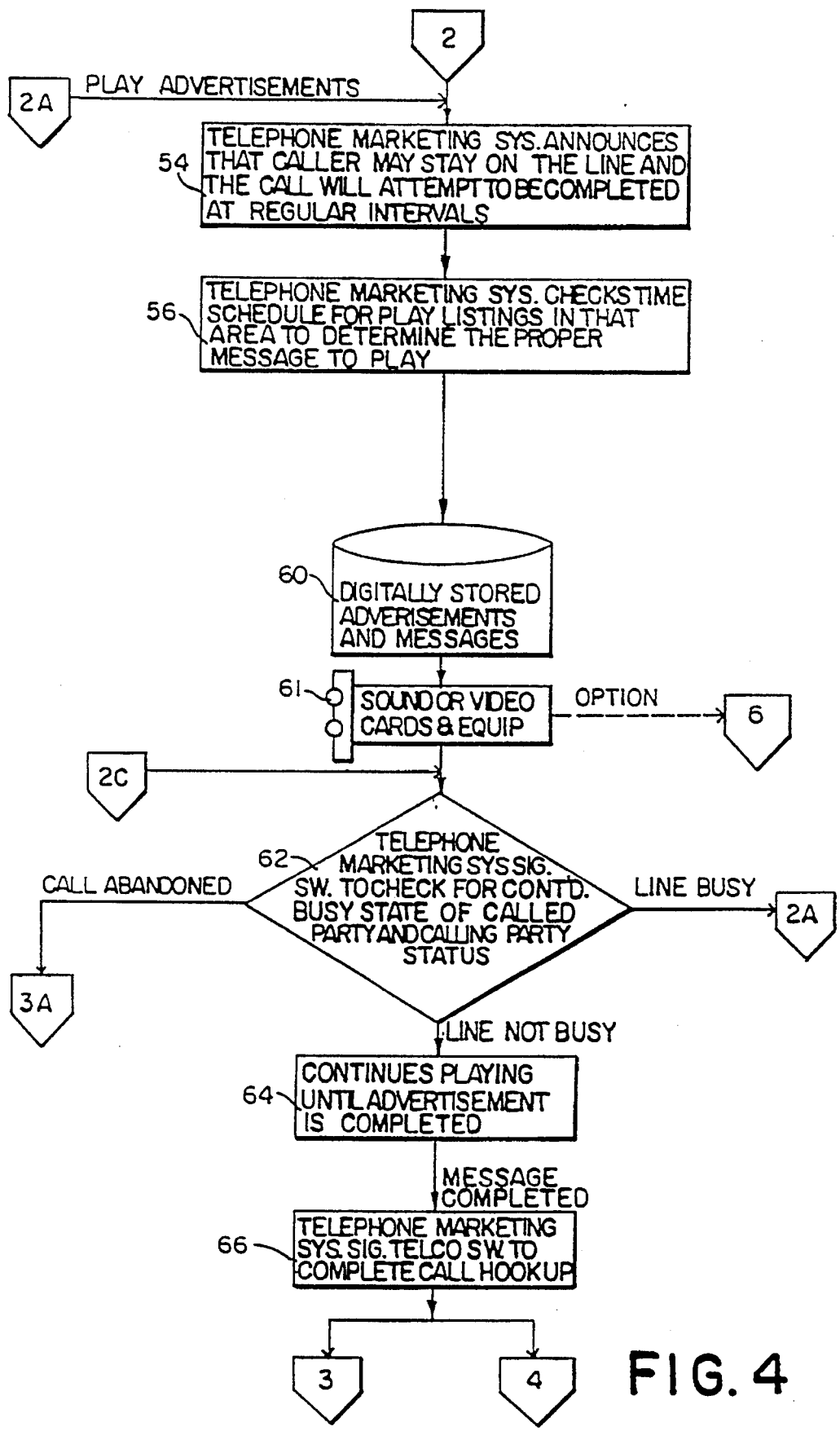
Figure 5:
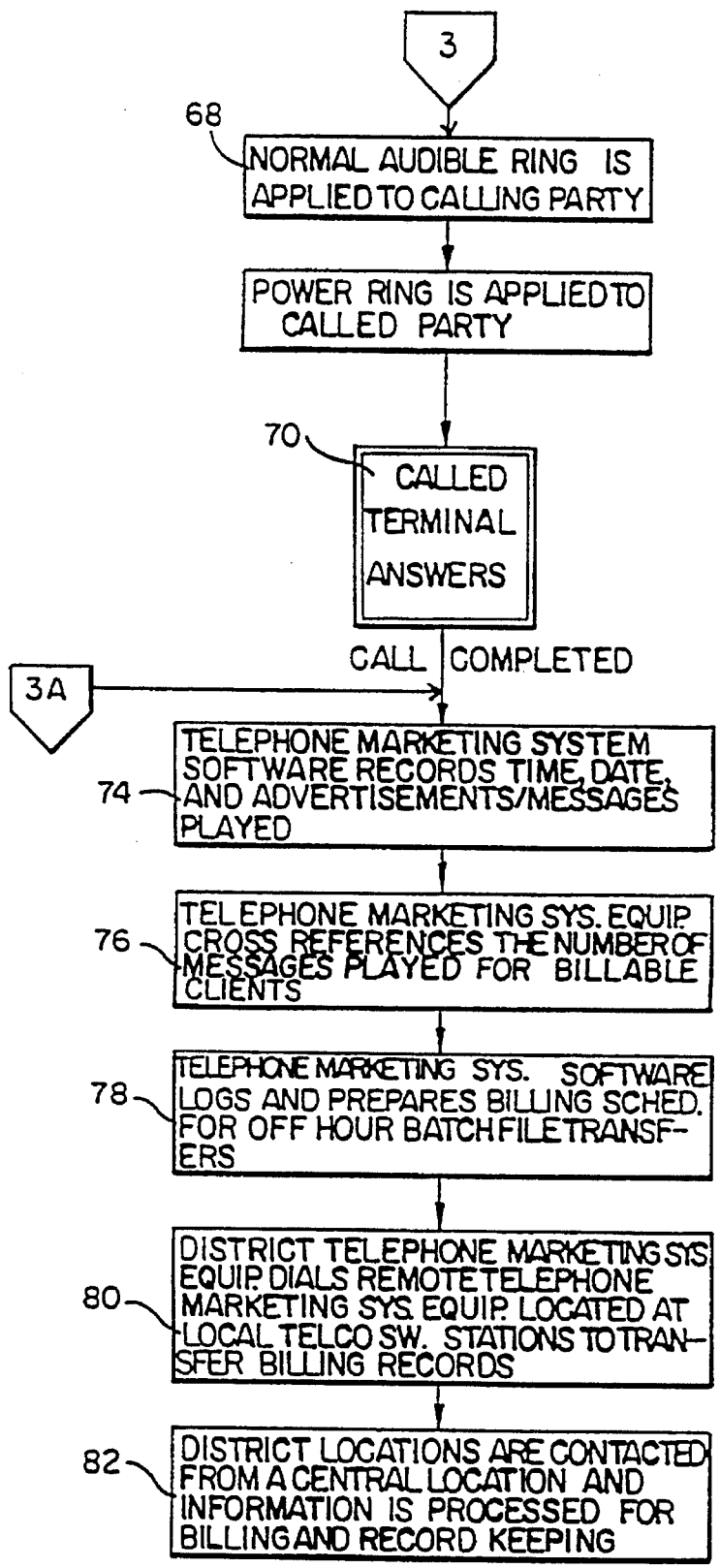
Figure 6:
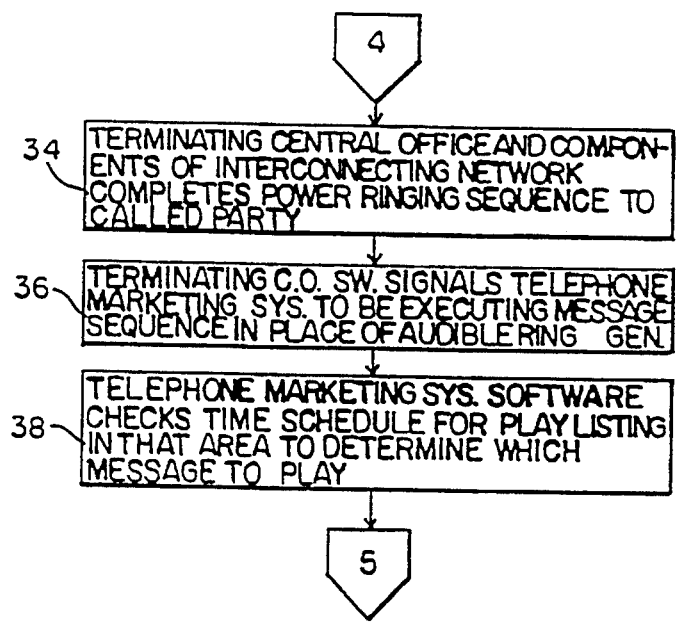
Figure 7:
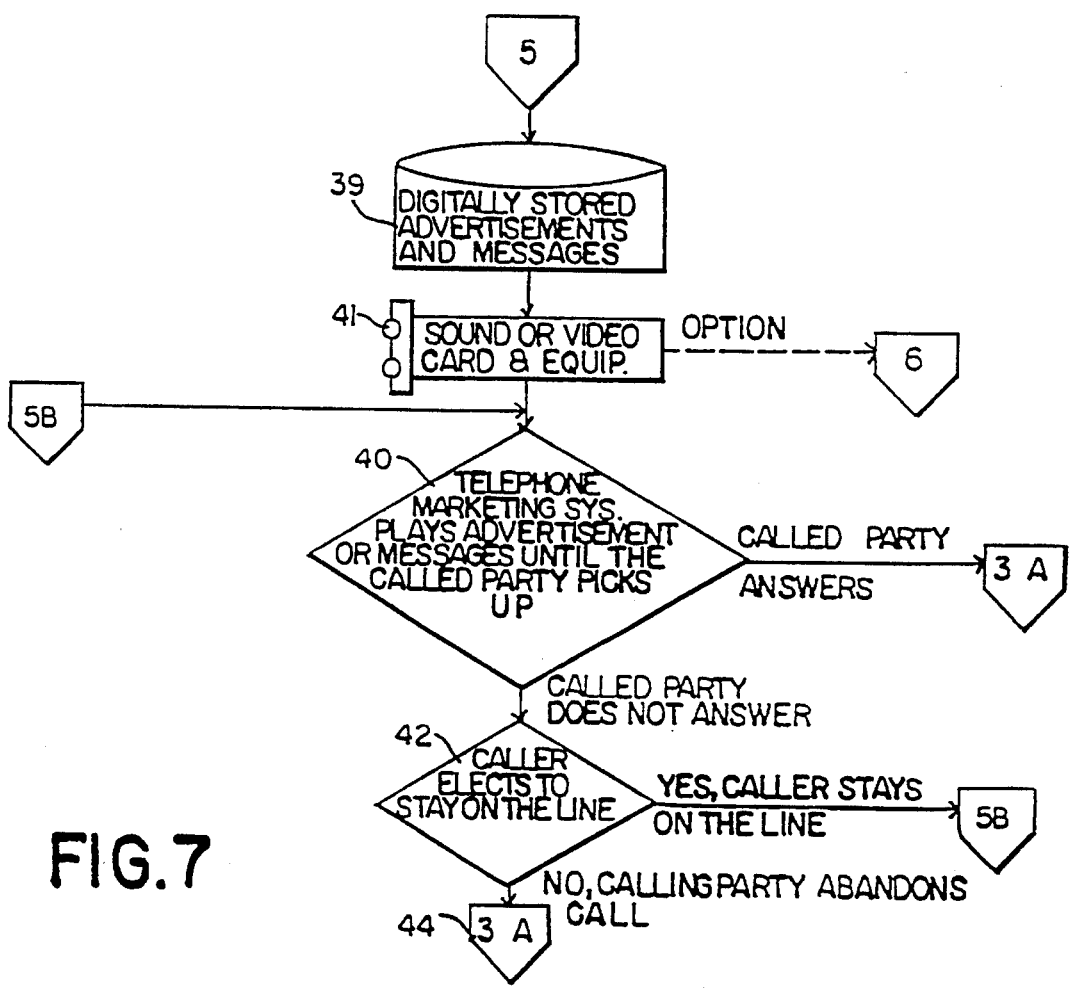

Referring specifically to FIGS. 3–11, there is shown a flow diagram depicting call handling procedures which can be performed by the preferred embodiments of the communications system 10 in accordance with the present invention. It is understood by those skilled in the art that although the flow diagrams often show duplicative steps, these steps could comprise a single software procedure or subroutine. Referring specifically to FIG. 3, a call is received from the first telephone station 12 located at a first location via a local or inter-exchange telecommunications network to a first local central office 15 at block 30. The called network address or station switch 22 located at a second local central office 21 receives the incoming call and it or the ANSS 23 determines the initial status of the second telephone 20 or identified called network address or station at block 32. If the second telephone 20 is idle (on-hook), the system 10 initiates a sequence of pre-recorded announcements as illustrated in FIGS. 6 and 7.

The second switch 22 located at the second local central office 21 or an ANSS 23 switches on a message generator 16 at block 36. The message generator 16 plays at least one pre-recorded announcement over the line to the calling party at the first telephone 12 at block 40. In the preferred embodiment, the pre-recorded announcements are played in predetermined segments of time. Each segment of time comprises a number of short messages and/or advertisements which are digitally stored within the system 10 and are designed to fill a 5–30 second time span. It is to be understood by those skilled in the art that the time frame for each segment of time is somewhat arbitrary and that the announcements can be played in any predetermined segment of time. The message generator 16 determines the type of announcements and the duration in which the announcements are to be played at block 38.

As discussed above, the announcements to be played are determined by comparing information, such as the network address of the first telephone 12 or the time of day, to a look up table located within the message generator 16 to determine which announcements are to be played. The commencement of the playing of the announcements is illustrated in FIG. 7. Once the playing format is determined in block 38, the digitally stored announcements are retrieved from the storage device 102 of the message generator 16 at block 39. The information is translated to audio and/or video signals at block 41.

Once the announcements are retrieved from the storage device 102, the message generator 16 plays a series of announcements to the calling party at the first telephone 12 at block 40. If the second telephone 20 is answered, the message generator 16 enters a completed call sequence which is illustrated in FIG. 5 beginning at 3A and which will be described hereinafter. If the second telephone 20 is not answered, the communications system 10 through switch 18 or an ANSS 23 determines if the first telephone 12 is still off-hook at block 42. If the first telephone 12 is still off-hook, the message generator 16 returns to 5B and repeats the steps described in blocks 40 and 42. If the call has been abandoned, i.e., the first telephone 12 is on-hook, the message generator 16 enters a completed call sequence which is illustrated in FIG. 5 beginning at 3A and which will be described hereinafter.

Referring now to FIG. 3, if the second telephone 20 is initially determined to be busy at block 32, i.e., the second telephone 20 is in use (off-hook), then the switch 22 at the second local central office 21 or an ANSS 23 determines whether there is enough network capacity available to activate the communications system 10 to prevent a network overload at block 46. If the current network load is greater than the established maximum network load, then the switch 22 or an ANSS 23 instructs the audible signal generator 14 to generate a standard busy signal as shown at block 48. The calling party abandons the call by disconnecting the first telephone 12 (on-hook) and the call is terminated as shown at block 50. If the current network load is determined to be less than the established maximum network load at block 46, the switch 22 or the ANSS 23 suspends call processing for a predetermined period of time and activates the message generator 16 to initiate a sequence of pre-recorded announcements at block 52 as further illustrated in FIG. 4.

In the preferred embodiment, the message generator 16 first instructs the calling party to remain on the telephone 12 and informs the calling party that the call to the second telephone 20 will be attempted to be completed at regular intervals at block 54. Communication messages are passed between the message generator 16 and the network's call processing software system to determine the current status of the second telephone 20. Simultaneously, the message generator 16 determines the type of announcements that should be played and the order in which they will be played at block 56. The message generator 16 then preferably transmits digitally stored advertisements, messages or announcements to the calling party at the first telephone 12 for a predetermined period of time at block 60. It is to be understood by those skilled in the art that any type of advertisement and/or message can be generated by the message generator 16. The information is translated to audio and/or video signals at block 61. When the predetermined time period has expired, the switch 22 or the ANSS 23 resumes call processing to determine whether the second telephone 20 is still busy at block 62. If the second telephone 20 is still busy, call processing is again suspended for a predetermined period of time and the switch 22 or the ANSS 23 notifies the message generator to return to 2A and repeat the steps in blocks 54–62. The announcement indicating that the line is busy may be eliminated after the initial message sequence. A sequence of additional announcements are played to the calling party at the first telephone 12 and call processing to the second telephone 20 is again retried within a predetermined period of time. In the preferred embodiment, if the second telephone 20 is not busy as determined by switch 22 or the ANSS 23, the switch 22 or the ANSS 23 notifies the message generator 16 to continue to play its announcements until it reaches completion of its current announcement (block 64) and then signals to switch 22 or the ANSS 23 to complete call processing to the second telephone 20 at block 66. The message sequence may optionally be interrupted at any point subsequent to the switch 22 or ANSS 23 determining that the second telephone 20 has become idle. The message generator then proceeds to the ringing and call completion sequence as shown in FIG. 5 or the call completion sequence as shown in FIG. 6.

Referring specifically to FIG. 5, once the second telephone 20 is determined to be idle and after the message generator has completed its message sequence, the switch 22 initiates a power ring which causes telephone 20 to ring by applying the appropriate voltage and current to the line between telephone 20 and switch 22. Once the second telephone 20 is answered by the lifting of the receiver of the second telephone 20 at block 70, the calling process is completed. At the completion of the call processing, the message generator 16 enters a call completion sequence and records the time, date and the type of announcements which have been played in the memory of the microprocessor 100 at block 74. Internal software in the message generator 16 cross-references the number of announcements played to the calling party at the first telephone 12 to the person or entity which is sponsoring each of the announcements at block 76. In the preferred embodiment, the sponsoring person or entity can be an advertiser or some other type of a billable or non-billable client. Next, the message generator 16 provides a billing schedule for determining the amount which the sponsoring person or entity should be charged at block 78. In the preferred embodiment, the message generator 16 is also capable of dialing to or being dialed by remote computing equipment (not shown) in order to transfer billing records so that the appropriate sponsoring person or entity can be billed at block 80. In an alternative embodiment, regional computing equipment which receives billing records from remote message generators can connect with central computing equipment for central billing and processing at block 82.

Referring specifically to FIG. 6, there is shown an alternative call completion sequence after the encountering of an initial busy condition. Once the system 10 signals the switch 22 or the ANSS 23 to resume call processing as shown in block 66, the second switch 22 initiates the power ringing sequence to the second telephone at block 34. Next the switch 22 at the second local central office 21 or the ANSS 23 signals to the message generator 16 to begin executing announcements at block 36. The message generator 16 then determines the announcement sequence to be played at block 38. The playing of the announcement sequence is shown in FIG. 7 and has been described above and will not be discussed further.

The network through which the call is being made can be an intelligent network, i.e., a network which utilizes advanced signaling techniques or a network having automated number identification (ANI) or a network having integrated services digital network (ISDN) capabilities. The previously described attached network signaling system 23 in this embodiment is part of intelligent network or ISDN capabilities. Automatic number identification or equivalent is a feature of a local exchange, inter-exchange or long distance network which passes the network address of the telephone line of the calling telephone 12 through the network where it is then available for processing. ISDN is an array of equipment, protocols, facilities and services which allow for certain advanced telecommunication capabilities. The message generator 16 can interact with the intelligent network via existing service nodes which are well-known in the art and will not be discussed further. By connecting the message generator 16 to the intelligent network, the message generator 16 is capable of utilizing many of the services available within the intelligent network as shown in FIG. 8 and will be described as follows.

Figure 8:
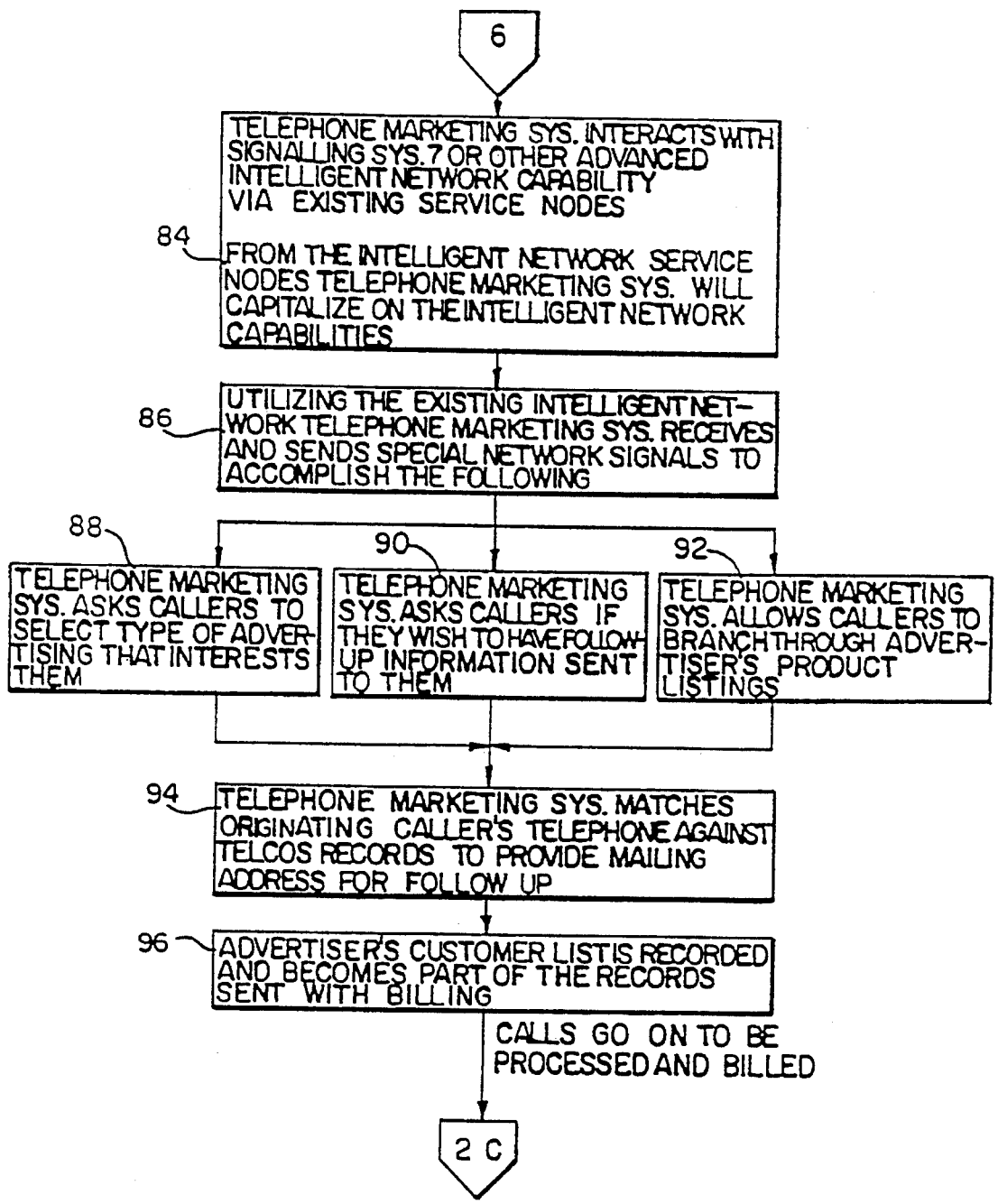
Figure 9A:
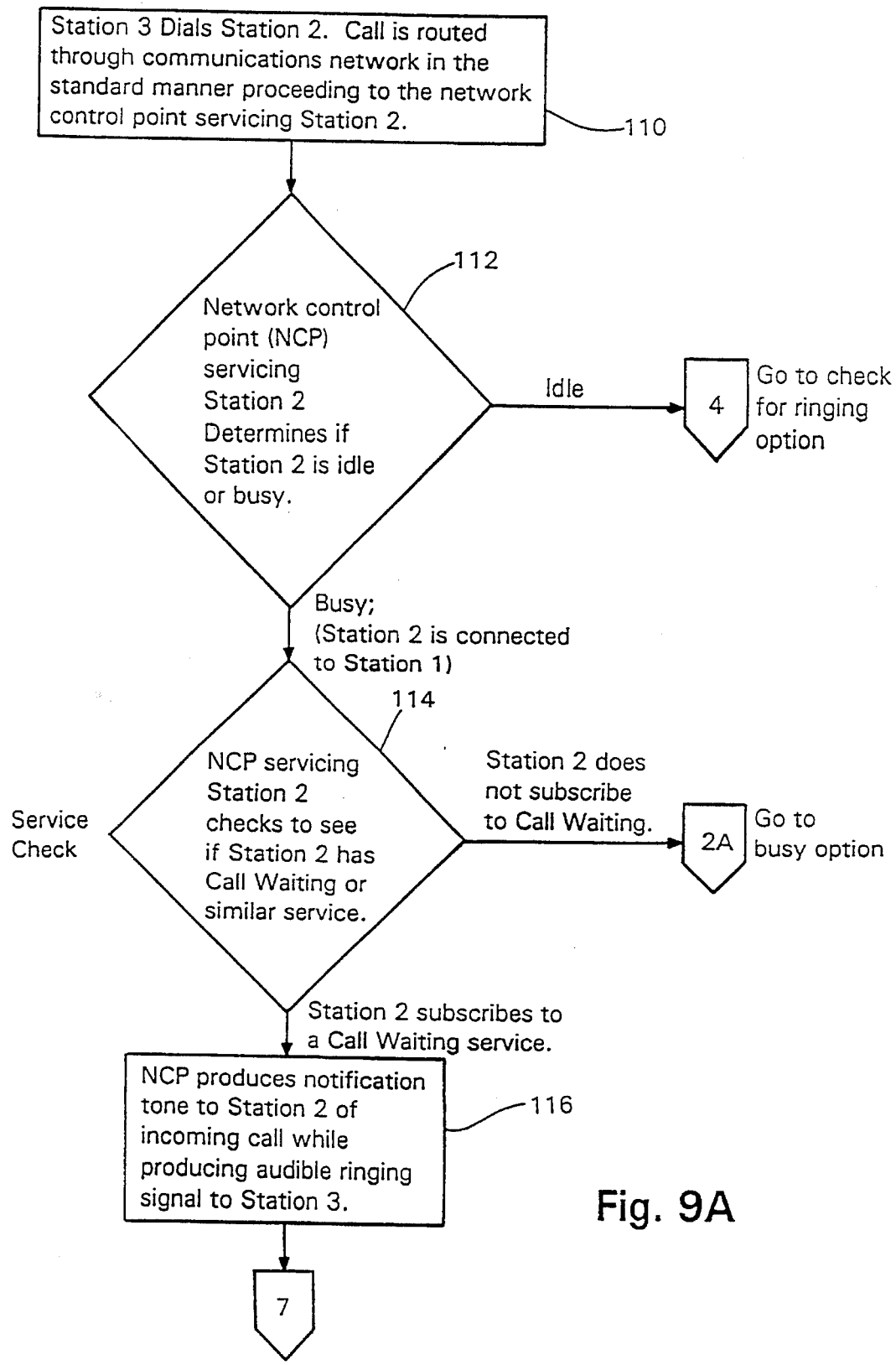
Figure 9B:
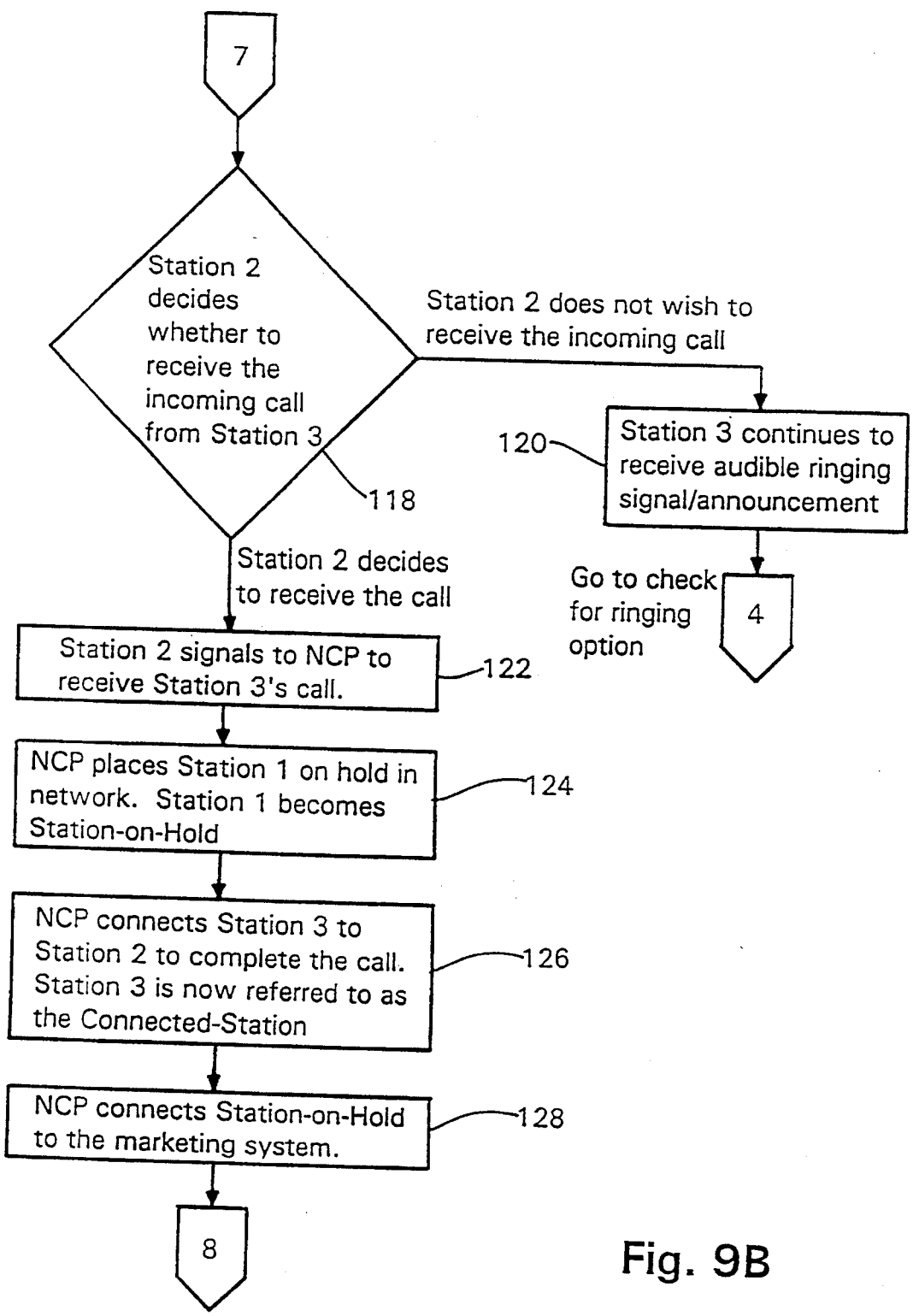
Figure 9C:
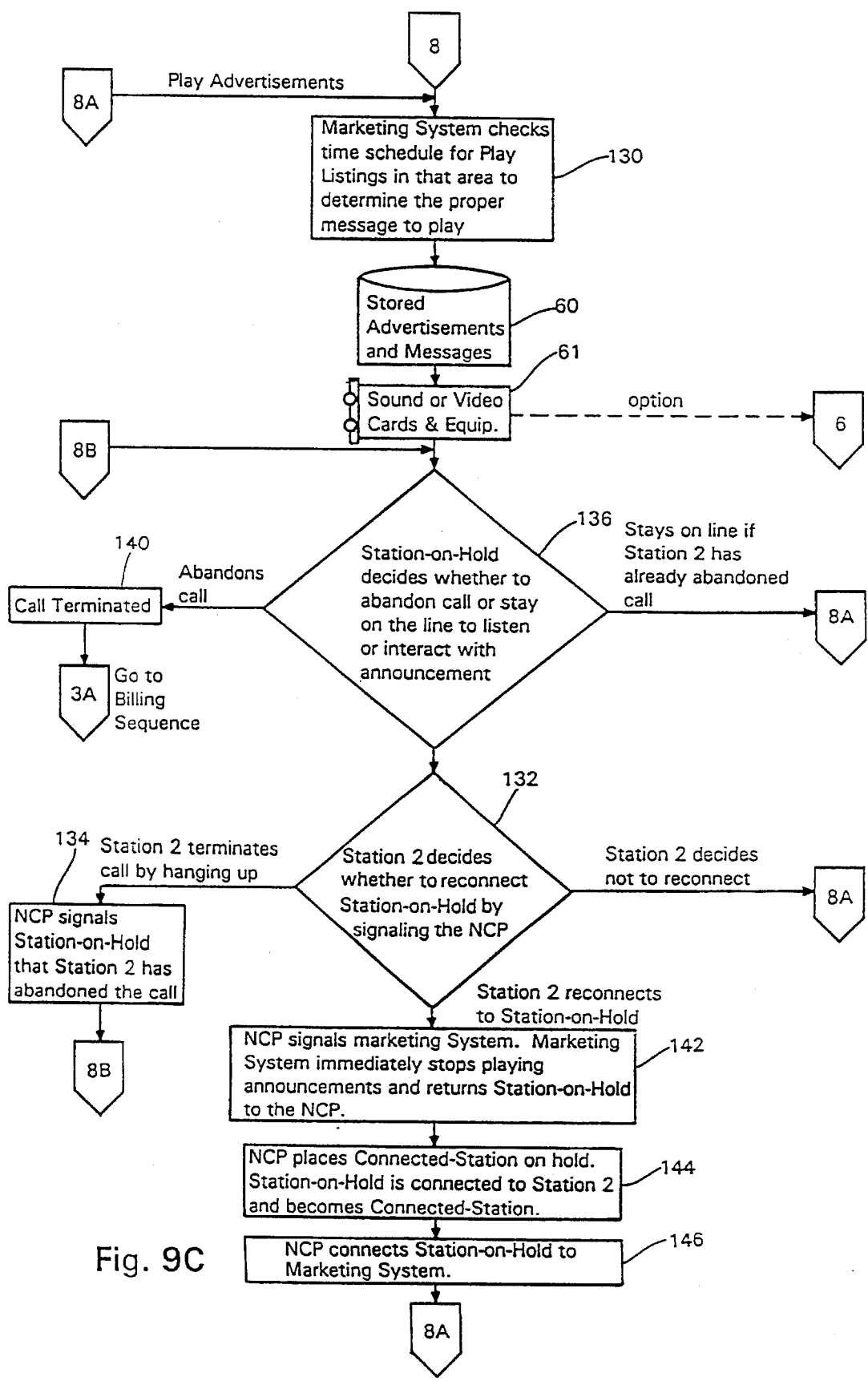

The message generator 16 receives and sends network signals using the existing intelligent network to accomplish various functions at block 86 (FIG. 8). The message generator 16 is capable of interacting with the calling party so that, for example, the calling party can obtain additional information relating to a particular announcement or select different types of advertising at block 88. At the appropriate prompt provided by the message generator 16, a calling party could respond either by voice or by pushing the appropriate buttons on a standard touch tone phone or by pressing a key on a keyboard to a computer, touch screen or any other device capable of transmitting and receiving signals. Once the message generator 16 detects the assertion of a given prompt by the calling party, the microprocessor 100 identifies the network address of the calling party using ANI or equivalent, and connects the calling party to a third party which can provide additional information. Alternatively, the prompt can provide a specific look-up address or an index to a look-up table to a location in the storage device 102 to provide a specific announcement of message. The network address of the additional party is obtained by retrieving the network address from a look up table located within the memory of the microprocessor 100. Once the network address of the third party is obtained, the message generator 16 interacts with the telephone network to enable the connection of the calling party to the third party. For example, if the announcement relates to a sale at a particular retail store, the calling party can be connected to the retail store automatically to obtain additional information. It is to be understood by those skilled in the art that additional information can be obtained for any announcement which is played provided that an appropriate prompt is initiated by the message generator 16. If a calling party decides to obtain additional information relating to a particular announcement, the calling party is permanently disconnected from the original call and must redial the original called network address or station line at a later time. Alternatively, the message generator 16 can provide upon a given prompt by the calling party a recording of the network address of the third party, who can provide additional information so that the calling party may later place a separate call to the third party. The network address of the third party is identified by referring to a look up table located within the memory of the microprocessor 100.

In an additional embodiment, the calling party can receive additional information by providing the mailing address of the calling party to the message generator 16. One method is for the calling party to respond to an offer of additional information by providing a given prompt. The message generator 16 then requests the calling party's name and address so that additional information can be provided. The calling party provides a name and address which is recorded in the memory of the message generator 16. The name and address of the calling party and the request for additional information is then transferred to the identified third party for further processing, such as a follow-up call or mailing of printed information. In an alternative embodiment, the message generator 16 is capable of identifying the network address of the calling telephone 12 when the message generator 16 receives a given prompt. Once the network address of the calling telephone is identified, the network address is compared to a reverse telephone directory located within the memory of the microprocessor 100 or the controller 17 from which the name and address of the calling telephone is retrieved. The name and address of the calling telephone is transmitted to the identified third party for further processing.

The types of advertisements or messages which can be directed to the calling party can refer to certain types of consumer goods, business machines, certain communication systems, or the products manufactured and/or sold, or services provided by a particular corporation or individual. It is to be understood by those skilled in the art, that the advertisements can be of any particular subject matter and are not restricted to those mentioned above. The message generator 16 is also capable of inquiring if the calling party wishes to be sent follow up information at block 90. If the calling party answers in the affirmative, the message generator 16 can record the name and address or fax number of the calling party and establish a customer mailing list therefrom. The calling party responds to the message generator 16 by either pushing a specified button on the face of the telephone if the calling party is using a touch tone telephone or a keyboard if the calling party is attached to a computer, or a voice activated response which would be transmitted to a device capable of recognizing and recording the calling party's response for later processing. The message generator 16 can also provide calling parties with a directory type service whereby a calling party could browse through an advertiser's product listings at block 92. Such a service would be advantageous if a sponsoring person or entity produced or manufactured a large number of products. Along with the listing, a caller could have the capability of requesting additional information, such as, but not limited to prices and quantity. As discussed above, if the calling party wishes to obtain additional information, the calling party can assert a given prompt to cause the message generator to connect the calling party to a third party.

If the address of the calling party is not identified during the announcement sequence, the message generator 16 is capable of matching the originating telephone 12 network address of the calling party with the records of the sponsoring person or entity to provide a mailing address for a follow up response at block 94. If the network has ANI or equivalent capabilities, the system can immediately identify the calling station by its identification number, i.e., its telephone number or network address. In addition, the message generator 16 can provide a recorded customer list at block 96 which can become a permanent part of the sponsoring person or entity's records and be included along in billing invoices.

It is to be noted that at the completion of any option of the system 10, the system 10 can monitor the status of the call through switch 18 or the ANSS 23, determine billing, and record relevant data about the advertisements which were played as described in blocks 74–80 of FIG. 5 which have been described previously.

In a first alternate embodiment, the marketing system 10 is used in conjunction with a call waiting service provided by the network administrator. The communications marketing system 10 permits transmitting a generally continuous pre-recorded announcement to a network station which is temporarily waiting to be reconnected to an identified called station. That is, an identified called station which has the call waiting service, when connected to a first call with a first party at a first network address can receive another call from another party at a separate network address. The identified called station signals the network to temporarily disconnect the first party and place it on hold within the network and connect the identified called station to the other party. Thereafter the identified called station can signal the network to reconnect the called station to the first party and place the third party on hold within the network.

Referring now to FIGS. 1 and 9A–9C, a telephone or network connection between two parties (i.e. first telephone 12 connected to second telephone 20 by way of switches 18 and 22) has already been described and will not be described again. If a third calling party at a communication device, in the present embodiment a third telephone 28 (FIG. 1) initiates a communication with the second telephone 20 at block 110, the second computerized switch 22 which receives the incoming call determines the status of the second telephone 20 or identified called network address or station, i.e., whether the second telephone 20 is in a busy state or in an idle state, at block 112. The attached network signaling system 23 can also determine the busy/idle status of the called network address or station line. If the second telephone 20 is idle (on-hook), the system 10 initiates a sequence of pre-recorded announcements which are played for the third calling party at the third telephone 28 in the manner previously discussed. If the second telephone 20 is not idle (off-hook), the station switch 22 or the ANSS 23 determines whether the second telephone 20 subscribes to a call waiting or similar service at block 114. If the second telephone 20 does not subscribe to a call waiting service, the system 10 can initiate a series of pre-recorded announcements to the third telephone 28, as previously discussed and illustrated in FIG. 4. If the second telephone 20 does subscribe to a call waiting service, the switch 22 or ANSS 23 transmits a signal to the second telephone 20 to notify the party using the second telephone 20 of the incoming call and also generates and transmits a call progress signal to the third telephone 28, at block 116.

Once the party using the second telephone 20 is notified of the incoming call, the party using the second telephone 20 can decide whether or not to answer the second telephone call or ignore the call at block 118. If the party using the second telephone 20 chooses not to answer the incoming call at block 120, the third telephone 28 continues to receive an audible ringback signal or as previously discussed, a pre-recorded announcement transmitted to the third telephone 28 by the message generator 26 in lieu of the call progress signal. If the party using the second telephone 20 decides to receive the incoming call from the third telephone 28, a predetermined response, such as a momentary toggle of the on/off hook switch, is initiated at the second telephone 20 to signal the switch 22 to temporarily disconnect the first telephone 12 from the second telephone 20 and place the first telephone 12 on hold within the network and connect the third telephone 28 to the second telephone 20 at block 122. As shown at block 124, the switch 22, in a manner known to those of ordinary skill in the art, temporarily disconnects the first telephone 12 from the second telephone 20 and places the first telephone 12 on hold within the network. At this point, the first telephone 12 is the station on hold. The switch 22 then connects the third telephone 28 to the second telephone 20 to complete the second call at block 126, making the third telephone 28 the connected station. At this time, the second switch 22 or the ANSS 23 switches on the message generator 26 at block 128. The message generator 26 plays at least one pre-recorded announcement over the line to the party at the station on hold, which is the first telephone 12 at block 130. The message generator 26 then preferably transmits digitally stored advertisements, messages or announcements to the party at the first telephone 12 for a predetermined period of time at block 60 or until the second telephone 20 signals to the switch 22 to reconnect the second telephone 20 to the first telephone 12. It is to be understood by those skilled in the art that any type of advertisement and/or message can be generated by the message generator 26. The information is translated to audio and/or video signals at block 61.

At block 136, the station on hold (at this time the first telephone 12) decides whether to abandon the call or stay on the line to continue to listen to messages or interact with the announcements at block 136. If the party at the station on hold decides to stay on the line, the message generator returns to 8A and continues to transmit messages to the station on hold within the network by repeating steps 130 and 60–61. If the party at the station on hold decides to abandon the call at block 136, then at block 140, the call is terminated and the message generator 26 enters a billing sequence, as previously discussed and which is illustrated in FIG. 5 beginning at 3A.

When the second telephone 20 signals the switch 22, in a known manner, to reconnect to the station on hold (e.g. the first telephone 12), at block 132, the switch 22 or the ANSS 23 signals the message generator 26 to discontinue playing announcements to the station on hold, resumes call processing and reconnects the station on hold to the second telephone 20 at block 142. Then, at block 144, the switch 22 places the previously connected station (e.g. the third telephone 28) on hold within the network, so that the previously connected station is now the station on hold. At block 146 the switch 22 signals the message generator 26 to play announcements to the station on hold. Call processing for the station on hold proceeds at 8A, with the message generator 26 transmitting messages to the station on hold by repeating steps 130 and 60–61.

If the second telephone 20 terminates the call by hanging up at block 132, the switch 22 or the ANSS 23 signals the station on hold that the second telephone has abandoned that call at block 134. Accordingly, call processing for the station on hold proceeds to 8B and continues processing at block 136. The second telephone can also decide at block 132 not to reconnect to the station on hold and not to terminate the call by hanging up, in which case, call processing proceeds to 8A to repeat the steps beginning at 130.

In the drawings, the third telephone 28 is connected to the second local central office 21. However, it is understood by those skilled in the art that the third telephone 28 could be connected to another local central office and the call routed by way of another communication network, which could be an inter-exchange network, long distance network, international network, telecommunications network, cable television network, broadcast network, switched network, dedicated network, or a hybrid type of the foregoing networks.

In a second alternate embodiment, the communications marketing system 10 is used in conjunction with a call hold service provided by the network administrator. The communications marketing system 10 permits transmitting a generally continuous pre-recorded announcement to a network station which is temporarily waiting to be connected or reconnected to an identified called station. That is, an identified called station which has the call hold service, when connected to a first call from a first party at a first network address can temporarily disconnect the first party and place the first party on hold within the network to provide the identified called station time to process information, interpose a delay, process a request or perform a similar or related task. For example, if the first party at the first network address wishes to obtain and view a video presentation from, for example, a file server or video file server at a second network address and the file server or video file server is not ready to send the video presentation for a predetermined period of time, for example, ten minutes later. The identified called station can signal the network to temporarily disconnect the first party and place the station on hold within the network and at a later time signal the network to reconnect the first party. Similarly, the first party at the first network address could initiate the call hold, for example, if the first party wishes to pause while viewing a video or playing an interactive game, then the first party at the first network address can signal the network to temporarily disconnect the first party and place the station on hold within the network and at a later time signal the network to reconnect the first party.

Figure 10A:
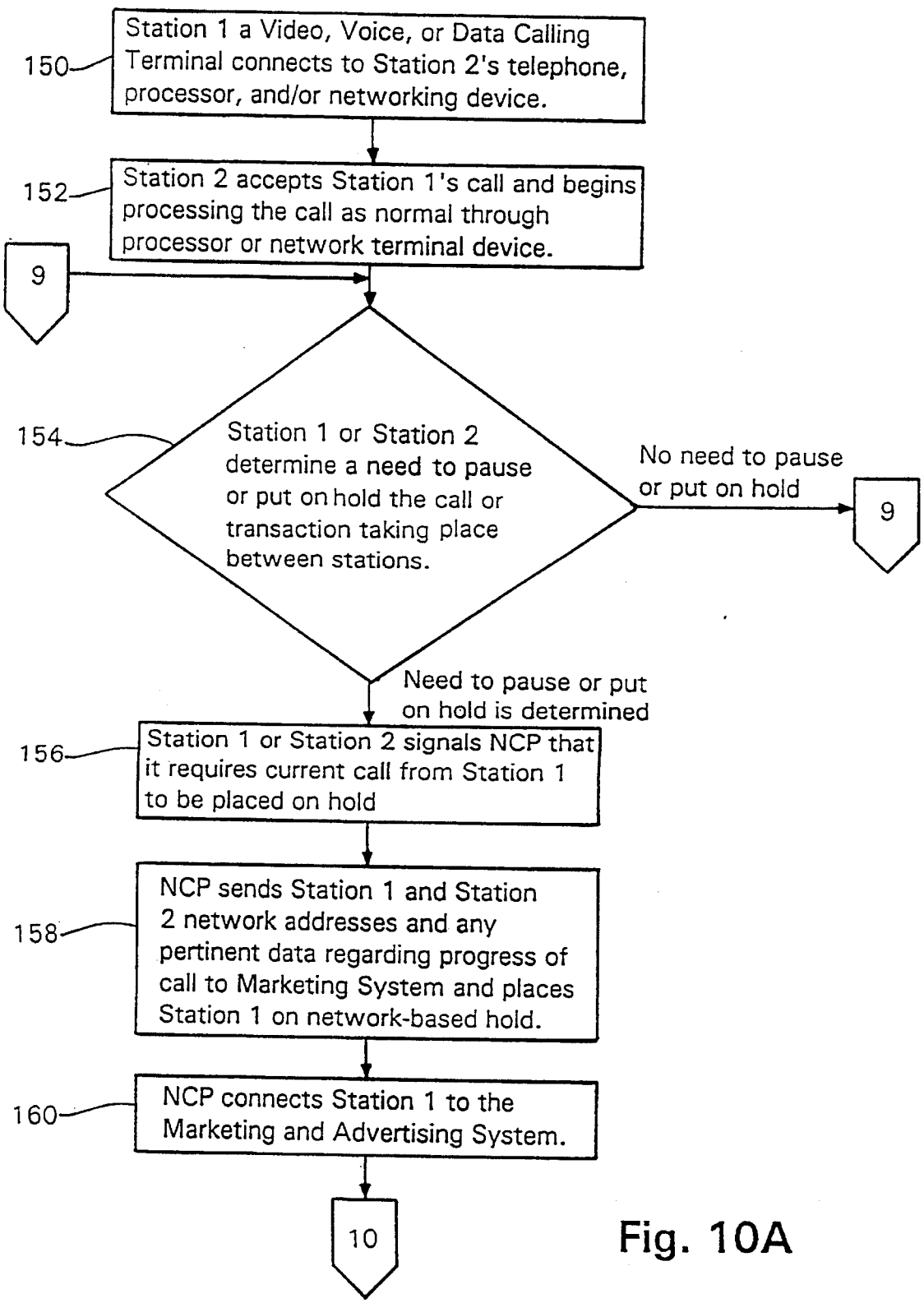
Figure 10B:
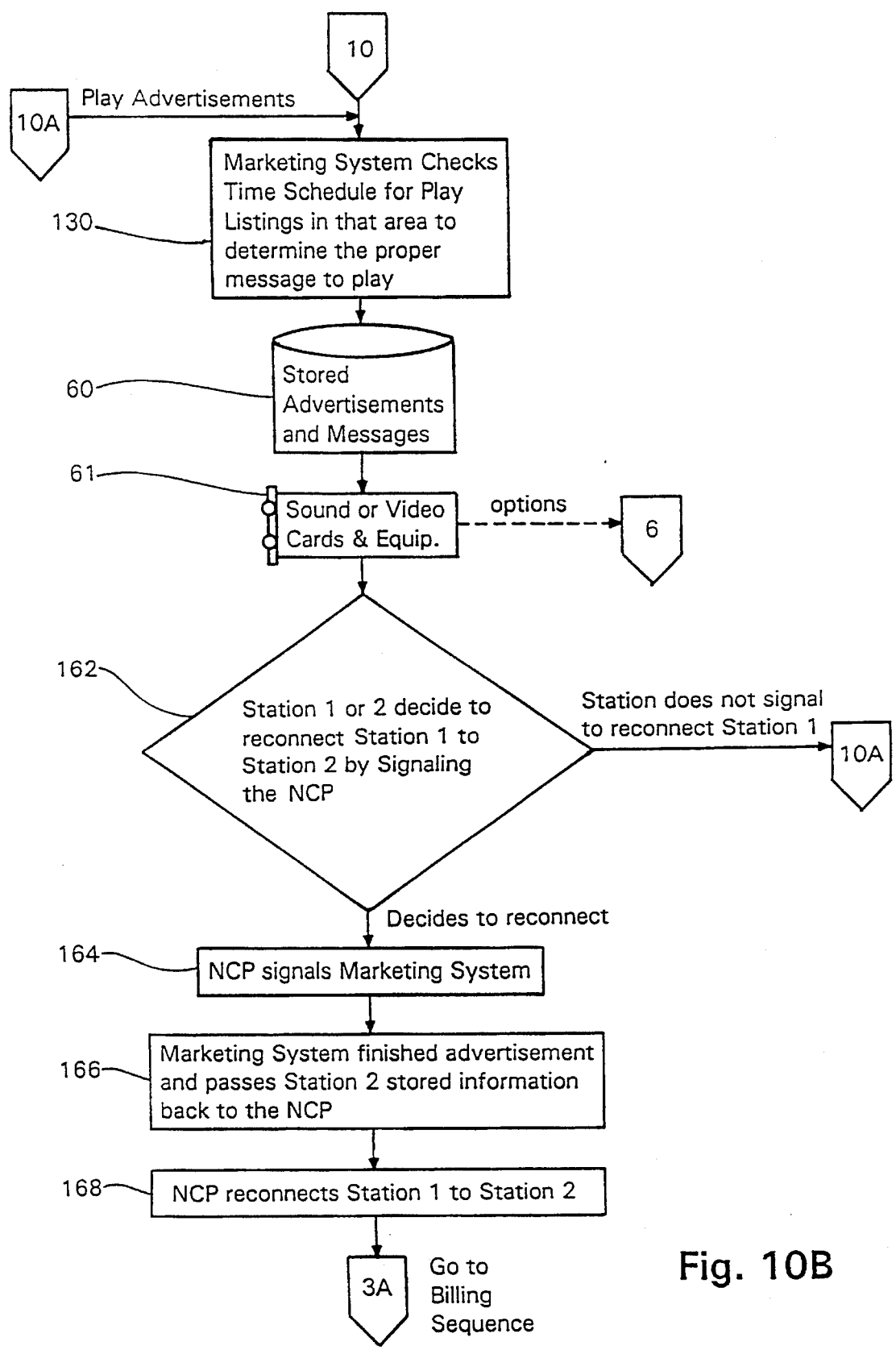

Referring now to FIGS. 10A and 10B, a telephone or network connection between two parties, (i.e. an audio, video, or data calling terminal) has already been described and will not be described in detail hereinafter. A first calling terminal, which could be a telephone 12 as illustrated in FIG. 1, but referring here more particularly to an advanced calling device, such as a computer, a video telephone, television set-top converter, or other network terminating device, establishes a network connection with a second station, again which could be a telephone 20 as illustrated in FIG. 1, but referring here more particularly to a more sophisticated device, such as a computer, a video telephone, video server, or other network terminating device, at block 150. The second station 20 initially accepts the call from the first station 12 at block 152.

During the connection between the first station 12 and the second station 20, if either station 12, 20 needs to pause or place the call or transaction taking place between the two stations 12, 20 on hold for any reason, the station 12, 20 can signal the switch 22 that it requires the call to be placed on hold at block 156. If neither station 12, 20 needs to pause or place the call on hold, the communication continues in the normal manner. The second station 20 could signal to the switch 22 that it requires the current call from the first station 12 to be temporarily placed on hold, for instance, if the second station 20 is a video server and the first station 12 has initiated the communication to download or transmit a video file, for instance, a movie or video game. The video server may need to temporarily place the call on hold within the network while it searches for and retrieves the requested video file or until an assigned playing time for the video arrives. It is understood by one of ordinary skill in the art that other types of data files may be requested for downloading or transmission, or that the first station 12 may wish to upload a file to the second station 20. Further, the first station 12 could signal to the switch 22 that it requires the current call to be temporarily placed on hold, for instance, if the first station is viewing a video or playing an interactive game and wishes to pause or temporarily suspend the video presentation or game. The switch 22 sends the first station 12 and the second station 20 network addresses and any other pertinent or relevant data regarding the call to the message generator 26 and places the first station 12 on a network based hold at block 158 and at block 160, the switch 22 connects the first station to the message generator 26.

Referring now to FIG. 10B, there is illustrated an example in which a second station 20 has placed a first station 12 on hold. It will be appreciated that the first station could initiate the network hold if desired. In FIG. 10B, the message generator 26 plays at least one pre-recorded announcement (audio and/or video) over the line to the first station 12 at block 130. The message generator 26 preferably transmits digitally stored advertisements, messages or announcements to the first station 12 for a predetermined period of time at block 60 or until the second station 20 signals to reconnect to the first station 12. As previously described, the messages or announcements are translated to audio and/or video signals at block 61.

The second station 20 decides to reconnect to the first station 12 by signalling the switch 22 at block 162. It is understood by those of ordinary skill in the art how a station can signal the switch 22 at the local central office 21 to reconnect the call to the first station 12. If the second station 20 does not signal to the switch 22 to reconnect to the first station 12, the message generator 26 returns to step 10A and continues transmitting announcements by repeating blocks 130 and 60–61. When the second station 20 has signalled to the switch 22 to reconnect the call to the first station 12, the switch 22 signals the message generator 26, as shown at block 164. The message generator 26 stops playing announcements to the first station 12 and passes the first station network address and any other relevant information back to the switch 22 (or ANSS 23) at block 166. second station 20 at block 168. The message generator 26 enters the completed call sequence, as previously discussed beginning at 3A. It is to be understood from this disclosure by those of ordinary skill in the art that the type of messages played can be determined exclusively by the marketing system 10 or by the party receiving the message initiating a predetermined response, or by responding to a prompt at the direction of the marketing system 10. It is also to be understood from this disclosure by those of ordinary skill in the art that messages played can contain audio and video components, and that the messages can be interactive, as previously discussed.

In a third alternate embodiment, the communications marketing system 10 includes software for replacing the dial tone signal indicating the availability of communication service transmitted from a switch 18 to a telephone or other network terminating device 12 with a generally continuous pre-recorded announcement, series of announcements, a custom announcement, or a selection menu to selected calling parties, stations, or network addresses. The calling party can interrupt the announcement, select alternate announcements, or choose a menu option by initiating a predetermined response, as described in more detail hereinafter.

As is well known in the art, when a calling party removes the handset 11 from the base of a telephone 12 or other device, a connection is formed with the switch 18 at first local central office 15 which is usually associated with a local telephone company. The switch 18 transmits a dial tone back to the first telephone 12 or other device to indicate the availability of communication service.

Figure 11A:
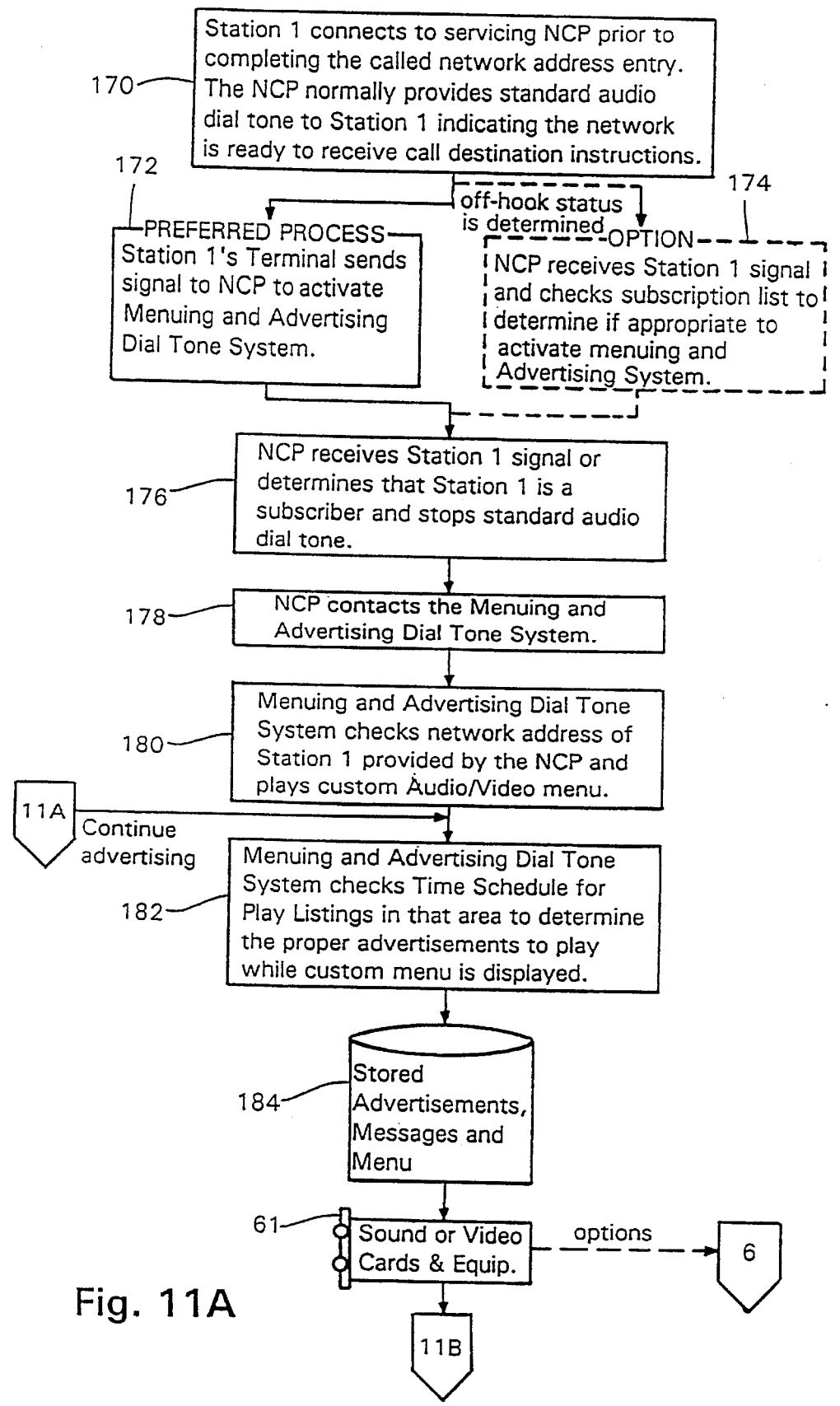
Figure 11B:
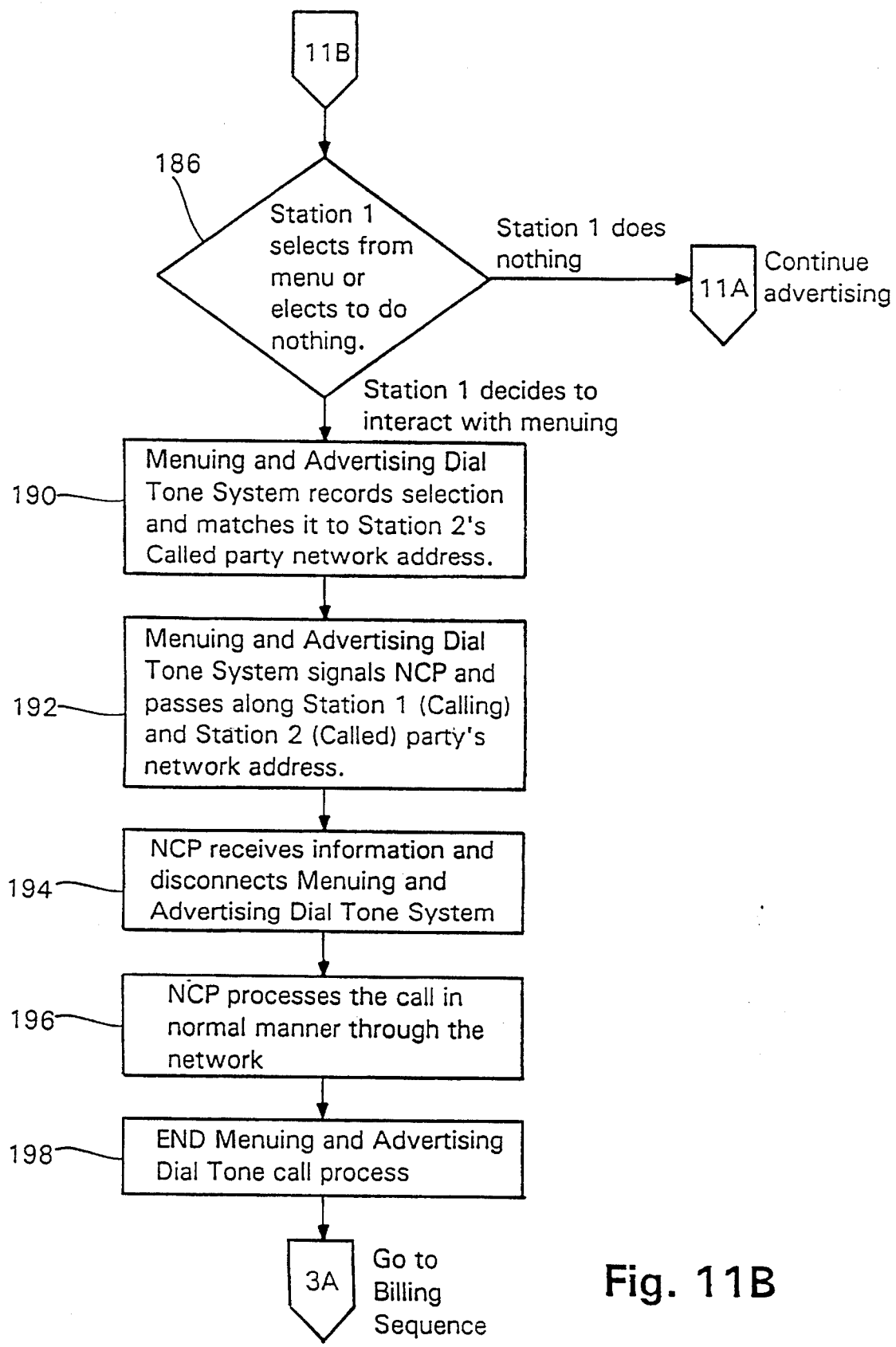

Referring now to FIGS. 11A–11B, the first telephone 12 or other device establishes a connection to the switch 18 by removing the handset 11 at block 170. In the preferred embodiment, the first telephone 12 or other device transmits a signal when it goes off-hook to the switch 18 to activate the marketing system 10 at block 172. Alternatively, the first telephone 12 or other device would establish a connection with the switch 18 in a known manner and a software routine at the switch 18 would be initiated, checking a subscription list to determine whether the first telephone 12 or other device is a subscriber to the alternate dial tone service provided by the marketing system 10. If the first telephone 12 or other device is on the subscriber list, the marketing system 10 is activated at block 174.

The switch 18 receives the signal from the first telephone 12 or other device or otherwise determines that the first telephone 12 or other device subscribes to the alternate dial tone service of the marketing system 10 and stops or avoids sending the standard audio dial tone to the first telephone 12 or other device at block 176. The switch 18 signals or otherwise notifies the message generator 16 at block 178. The message generator 16, as previously discussed, is capable of playing one or more pre-recorded announcements and/or can provide a menuing system allowing for interactive communication with a connected device. The announcements can include both audio and video components. The message generator 16 checks the network address of the first telephone 12 or other device provided by the switch 18 and transmits either a standard announcement and/or menu, an announcement based upon the geographic location or time of day, a custom announcement tailored for the specific network address of the first telephone 12 or other device, or an announcement chosen based upon other pertinent factors at block 180. The message generator 16 includes software which is capable of providing a custom menu and custom announcements to subscribers. The message generator 16 provides customized menus for selected subscribers based upon previous menu selections made by the subscribers. That is, the software contains software agents and filters which allow the software to learn (i.e. remember and act upon) a subscribers previous menu selections and customize an individual subscriber menu based upon the previous selections or other subscriber input. It is understood by those of ordinary skill in the art how to provide software including software filters and agents to provide a system which self-learns based upon previous subscriber menu selections or other subscriber input and accordingly, such software will not be discussed further herein. The message generator 16 determines the type of announcements that should be played and the order in which they will be played at block 182. The message generator 16 then preferably transmits digitally stored advertisements, messages or announcements to the calling party at the first telephone 12 or other device for a predetermined period of time at block 184. It is to be understood by those skilled in the art that any type of advertisement and/or message can be generated by the message generator 16. The information is translated to audio and/or video signals at block 61. The first telephone 12 or other device receives the announcements and/or the menu and can select an option from the menu or initiate a predetermined response to the announcements, or continuing receiving announcements at block 186. If the first telephone 12 or other device does not respond to the announcements or select a menu option, the message generator returns to 11A and continues transmitting announcements by repeating the steps in blocks 182, 184, 61, and 186. If the first telephone 12 or other device transmits a predetermined response or command to the message generator 16, the message generator 16 records the command and initiates a response to the command at block 190. For instance, the first telephone 12 or other device can choose to initiate a call to a second telephone 20 or other device, in which case the message generator 16 signals the switch 18 and transmits the first telephone 12 or other device network address and the second telephone 20 or other device network address to the switch 18 at block 192. It is to be understood by those of ordinary skill in the art that the message generator 16 need not physically transmit the pertinent data to the switch 18, but could update a storage location with the pertinent data or provide a data pointer to a storage location which is accessible to the switch 18, in which case, the switch 18 could then access the memory location.

The switch 18 receives the pertinent information and disconnects the message generator 16 from the first telephone 12 or other device at block 194. The switch 18 then proceeds to process the call in the normal manner through the network at block 196. The message generator 16 then enters a completed call sequence at block 198 and then proceeds to the billing sequence beginning at 3A.

From the foregoing description, it can be seen that the present invention comprises a communications marketing system for selectively modifying an existing communications network by replacing at least a portion of an audible or visual call progress signal and/or the dial tone signal generated by the communications network by a pre-recorded announcement and by modifying a portion of the existing call processing software of the communications network. The communications marketing system is also capable of playing a pre-recorded announcement to a station which has been temporarily disconnected from another station and placed on hold within the network. It will be appreciated by those skilled in the art that changes could be made to the embodiments described above without departing from the broad inventive concept thereof. It is understood, therefore, that this invention is not limited to the particular embodiments disclosed but it is intended to cover all modifications which are within the scope and spirit of the invention as defined by the appended claims.

We claim:

1. A marketing system for selectively modifying an existing communications network by modifying a portion of the processing software of the existing communications network to permit transmitting a generally continuous prerecorded announcement to a network station which is waiting to reconnect to a call with an identified called station, wherein an identified called station connected to a first call with a first party at a first station at a first network address can receive another call from another party at another station at a separate network address, the identified called station signalling the network to temporarily disconnect the first station and place the first station on hold within the network and to connect the identified called station to the other station, and thereafter the identified called station being able to reconnect to the first station, the system comprising:

means for placing a first call by a first party at a first station having a first network address to a second station having a second network address;

means for connecting the first call to the second station;

means for placing a second call from a third station having a third network address to a selected one of the first and second stations;

means for notifying the one selected station of the second call and transmitting a call progress signal to the third station;

means for the one selected station to temporarily disconnect from the nonselected station and place the nonselected station on hold within the network and for connecting the one selected station to the third station;

means for playing at least one generally continuous announcement to the nonselected station while the nonselected station is on hold within the network; and means for the one selected station to temporarily disconnect from the third station and reconnect to the nonselected station, thereby terminating the playing of the announcement to the nonselected station.

2. The system as recited in claim 1 wherein the third station is placed on hold within the network when the nonselected station is reconnected to the one selected station, and the means for playing plays at least one generally continuous announcement to the third station while the third station is on hold within the network.

3. The system according to claim 1 further comprising means for notifying the station on hold within the network that the one selected station has abandoned the call if the one selected station abandons the call.

4. The system according to claim 1 further comprising means for playing at least one generally continuous announcement to the third station in lieu of transmitting a call progress signal to the third station, until the third station abandons the second call or the one selected station answers the second call.

5. The system as recited in claim 1 wherein the playing means plays a sequence of announcements and wherein the system repeatedly generates additional announcements at predetermined intervals until the station on hold is reconnected to the one selected station or the station on hold abandons the call.

6. The system as recited in claim 1 further comprising interaction means for permitting a party at the station on hold within the network to interact with the means for playing an announcement, during the playing of the announcement, by initiating a predetermined response.

7. The system as recited in claim 1 further comprising selecting means for allowing a party at the station on hold to select a type of announcement to be played.

8. The system according to claim 1 wherein the announcement includes audio and video components.

9. The system as recited in claim 1 wherein the announcement is digitally stored within the playing means.

10. The system as recited in claim 1 wherein the playing means determines the announcement to play based upon criteria established by the marketing system.

11. The system as recited in claim 1 further comprising means remotely located from the playing means for changing, updating or deleting the announcement.

12. A method for use with an existing communications network for playing one or more generally continuous announcements to a network station which is waiting to reconnect to a call with an another network station, wherein a first party at a first station at a first network address on a call with a second station at a second network address can receive a call from a third station at a third network address, the first station signalling the network to temporarily disconnect the second station and place the second station on hold within the network and to connect the first station to the third station, and thereafter the first station being able to reconnect to the second station, the method comprising:

connecting a first party at a first station having a first network address to a second station having a second network address to complete a first call;

a third station having a third network address placing a second call to a selected one of the first and second stations;

notifying the one selected station of the second call and transmitting a call progress signal to the third station;

the one selected station of the second call signalling the network to temporarily disconnect from the nonselected station and place the nonselected station on hold within the network;

connecting the one selected station to the third station;

playing at least one generally continuous announcement to the nonselected station while the nonselected station is on hold within the network;

the one selected station signalling the network to temporarily disconnect from the third station and reconnect to the nonselected station;

disconnecting the third station from the one selected station and reconnecting the nonselected station to the one selected station; and terminating the playing of the announcement to the nonselected station and reconnecting the nonselected station to the one selected station.

13. The method as recited in claim 12 further comprising the step of placing the third station on hold within the network in response to the one selected station signalling the network to temporarily disconnect from the third station; and playing at least one generally continuous announcement to the third station while the third station is on hold within the network.

14. The method as recited in claim 12 further comprising the step of notifying the station on hold within the network that the one selected station has abandoned the call if the one selected station abandons the call.

15. The method as recited in claim 12 further comprising the step of playing at least one generally continuous prerecorded announcement to the third station in lieu of transmitting a call progress signal to the third station.

16. The method as recited in claim 12 further comprising the step of permitting the station on hold within the network to interact with the announcement, during the playing of the announcement, by initiating a predetermined response.

17. The method as recited in claim 12 further comprising the step of allowing the station on hold within the network to select a type of announcement to be played.

18. A marketing system for selectively modifying an existing communications network by modifying a portion of the processing software of the existing communications network to permit transmitting a generally continuous pre-recorded announcement to a network station which is waiting to reconnect to a call with another network station, wherein a first station at a first network address is connected to a call with a second station at a second network address, a selected one of the first or second stations signalling the network to temporarily disconnect the other station and place the other station on hold within the network, the selected station being able to reconnect to the other station, the system comprising:

means for placing a call by a first party at a first station having a first network address to a second station having a second network address;

means for connecting the call to the second station;

means for a selected one of the first and second stations to notify the network to temporarily disconnect from the other station and place the other station on hold within the network;

means for playing at least one generally continuous announcement to at least one of the one selected station and the other station while the other station is on hold within the network; and means for the one selected station to reconnect to the other station, thereby terminating the playing of the announcement.

19. The system according to claim 18 wherein the means for playing plays the announcement only to the one selected station while the other station is on hold.

20. The system according to claim 18 wherein the means for playing plays the announcement only to the other station while the other station is on hold.

21. The system according to claim 18 further comprising means for notifying the station on hold within the network that the one selected station has abandoned the call if the one selected station abandons the call.

22. The system as recited in claim 18 wherein the playing means plays a sequence of announcements and wherein the system repeatedly generates additional announcements at predetermined intervals until the station on hold is reconnected to the one selected station or the station on hold or the one selected station abandons the call.

23. The system as recited in claim 18 further comprising interaction means for permitting the station to which the announcement is played to interact with the means for playing an announcement, during the playing of the announcement, by initiating a predetermined response.

24. The system as recited in claim 18 further comprising selecting means for allowing the station to which the announcement is being played to select a type of announcement to be played.

25. The system according to claim 18 wherein the announcement includes audio and video components.

26. The system as recited in claim 18 wherein the announcement is digitally stored within the playing means.

27. The system as recited in claim 18 wherein the playing means determines the announcement to play based upon criteria established by the marketing system.

28. A method for use with an existing communications network for playing one or more generally continuous announcements to a network station which is waiting to reconnect to a call with another network station, wherein a first station at a first network address is connected to a call with a second station at a second network address, a selected one of the first or second stations being temporarily disconnected from the other station and placed on hold within the network and prior to reconnecting the one selected station to the other station, the method comprising:

the first station signalling the network to place the second station on hold within the network;

temporarily disconnecting the first station from the second network address and placing the second station on hold within the network;

playing at least one generally continuous announcement to at least one of the first station and the second station while the second station is on hold within the network;

the first station signalling the network to reconnect to the second station; and terminating the playing of the announcement and reconnecting the second station to the first station.

29. The method as recited in claim 28 wherein the announcement is played only to the first station.

30. The method as recited in claim 28 wherein the announcement is played only to the second station.

31. The method as recited in claim 28 further comprising the step of playing a sequence of announcements at predetermined intervals until the first station signals the network to reconnect the call to the second station or the first station abandons the call.

32. The method as recited in claim 28 further comprising the step of permitting the station to which the announcement is played to interact with the announcement, during the playing of the announcement, by initiating a predetermined response.

33. The method as recited in claim 28 further comprising the step of allowing the station to which the announcement is played to select a type of announcement to be played.

34. The method as recited in claim 28 wherein the announcement is determined based upon criteria established by the marketing system independent of the identity of the network address of either the first station or the second station.

35. A marketing system for selectively modifying an existing communications network by modifying a portion of the processing software of the existing communications network and by replacing at least a portion of a dial tone signal generated by the communications network by a generally continuous pre-recorded announcement, the system comprising:

means for placing a first call by a party at a first station at a first network address;

means for connecting the first station at the first network address to a switch in the communications network, the switch transmitting a dial tone signal to the first station;

means for signalling the switch to activate the marketing system; and means for playing at least one generally continuous announcement to the party at the first station in lieu of the dial tone signal for a predetermined period of time or until the party at the first station abandons the communication attempt.

36. The system as recited in claim 35 further comprising interaction means for permitting the first station to interact with the means for playing an announcement by initiating a predetermined response.

37. The system as recited in claim 35 wherein the means for playing plays a custom announcement based upon the first network address.

38. The system as recited in claim 37 wherein the means for playing includes filters and agents that allow for the customization of the announcement, the custom announcement being based upon input by the party at the first station at the first network address.

39. The system as recited in claim 35 further comprising;
means for checking a subscription list to determine the presence of the first network address on the subscription list and providing a signal indicative thereof; and
means for activating the marketing system in response to said signal.

40. The system as recited in claim 35 wherein the announcement includes audio and video components.

41. The system as recited in claim 35 wherein the playing means plays a sequence of announcements and wherein the system repeatedly generates additional announcements at predetermined intervals until the first station initiates a predetermined response.

42. The system as recited in claim 35 further comprising selecting means for allowing the first station to select a type of announcement to be played.

43. The system as recited in claim 35 wherein the announcement is digitally stored within the playing means.

\* \* \* \* \*